US008533010B2

(12) United States Patent
Daouk et al.

(10) Patent No.: US 8,533,010 B2
(45) Date of Patent: Sep. 10, 2013

(54) DE-SYNCHRONIZATION MONITORING SYSTEM AND METHOD

(75) Inventors: Carine H. Daouk, Antibes (FR); Christophe Defayet, Grasse (FR); Thomas Pare, Grasse (FR)

(73) Assignee: Amadeus S.A.S., Sophia Antipolis (FR)

( * ) Notice: Subject to any disclaimer, the term of this patent is extended or adjusted under 35 U.S.C. 154(b) by 88 days.

(21) Appl. No.: 13/135,461

(22) Filed: Jul. 5, 2011

(65) Prior Publication Data

US 2012/0265562 A1 Oct. 18, 2012

(30) Foreign Application Priority Data

Apr. 18, 2011 (EP) ..................................... 11305462

(51) Int. Cl.
*G06Q 10/00* (2012.01)
(52) U.S. Cl.
USPC ................................................ 705/5; 705/1.1
(58) Field of Classification Search
USPC .............................. 705/1.1, 5, 7.11–7.36, 400
See application file for complete search history.

(56) References Cited

U.S. PATENT DOCUMENTS

| 5,832,451 | A  | * | 11/1998 | Flake et al. ........................ 705/5 |
| 7,809,593 | B2 |   | 10/2010 | Daouk et al. ....................... 705/5 |
| 2008/0288302 | A1 | * | 11/2008 | Daouk et al. ..................... 705/5 |
| 2011/0071864 | A1 | * | 3/2011 | Hourdou et al. .................. 705/6 |

* cited by examiner

*Primary Examiner* — George Chen
(74) *Attorney, Agent, or Firm* — Wood, Herron & Evans, LLP

(57) ABSTRACT

A method and a system are provided to analyze passenger name records (PNRs) stored in a PNR database (DB). The method includes automatically analyzing each action performed on a PNR stored in the PNR DB. When an action results in an occurrence of a de-synchronization event between the PNR and a corresponding electronic ticket, the method further includes automatically changing a status in the PNR from Established to Orphan. If a final status of the PNR is determined to be Orphan, the method sets a flag in the PNR to enable at least the display of information to an agent, where the displayed information is based on data included in the PNR and is displayed automatically to an agent, and at least indicates the occurrence of the de-synchronization event and a reason for the occurrence of the de-synchronization event.

24 Claims, 21 Drawing Sheets

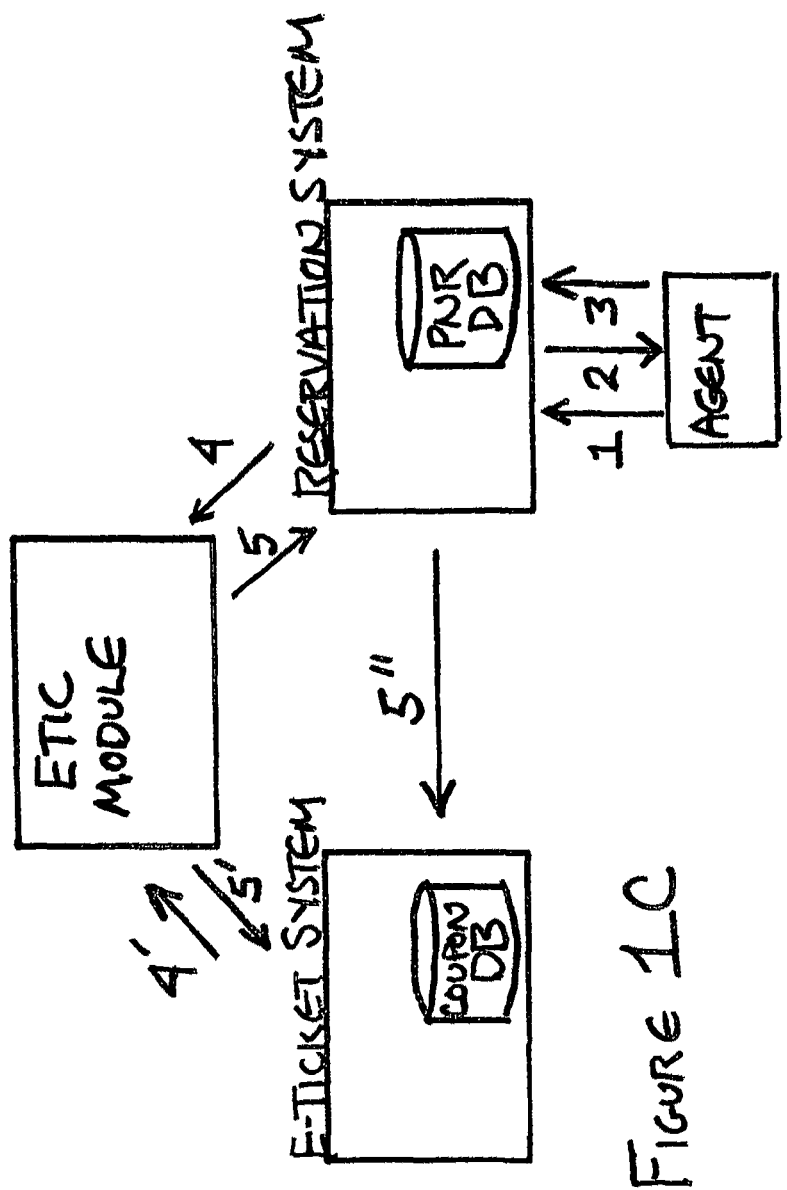

| ALPHA/A | |
|---|---|
| Products | Documents |
| 1 QF 452 10MAR J LHRNCE 0940 | UNMATCHED |
| 2 BA 341 22MAR J NCELHR 0730 | UNMATCHED |
| 3 AA 567 19APR J LHRCDG 0540 | UNMATCHED |
| 4 UNMATCHED | 081-1234567890/C2 |
| 5 UNMATCHED | 125-1567899990/C1 |
| 6 UNMATCHED | 001-1554567890/C3 |
| 7 PENALTY FEE FOR TICKET 125-1234567890 | WAIVED |
| 8 PENALTY FEE FOR TICKET 125-1234567890 | UNMATCHED |

Figure 8

```
PASSENGER NAME LIST
LP/BA341/29OCT/UNMATCHED
NCELHR
001  02BAGEDO/ENAM MISS    Z9YB44   J    HK 26OCT NCLBA0800
002  02KYVELOS/KYRIAKOS    Z9YB44   J    HK 26OCT NCLBA0800
003  01MAREUSE/ALDO MR     ZSRXJS   J    HK 04OCT CAIEG236E
004  01ROMIC/RANKA         3NEG6F   J    HK 25OCT NCESR2109
005  01SIMPSON/JMR         3TKREL   J    HK 06OCT LYSBA080A
006  01WILLIAMS/ANDY       YAKDQQ   J    HK 11OCT HDQ1S
007  01BERTIN/DIDIER       3X32PJ   C    HK 06OCT MRSHX2107
008  01PACHA/AMERMR        3G97A9   C    HK 24OCT SWI1G
009  01SAUNDERS/MARTINE    ZJETJF   C    HK 20OCT NCEHX2109
```

Figure 10

ETIC Cell 1100

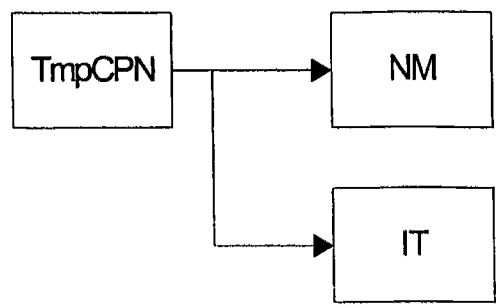
Figure 12A
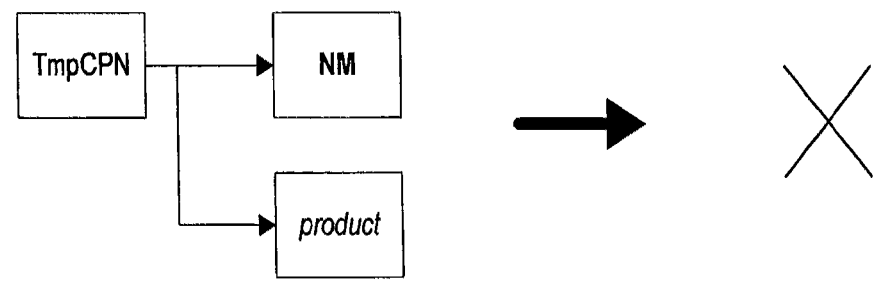
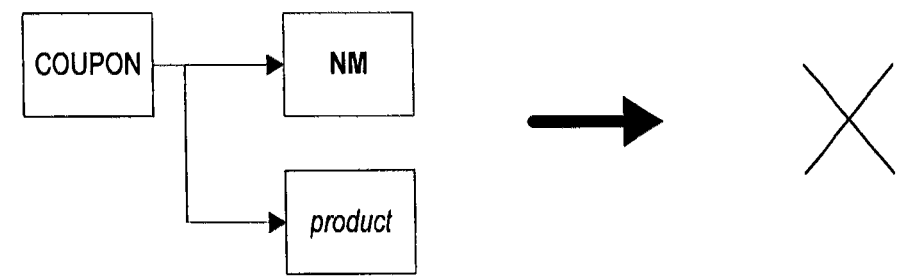
Figure 12B

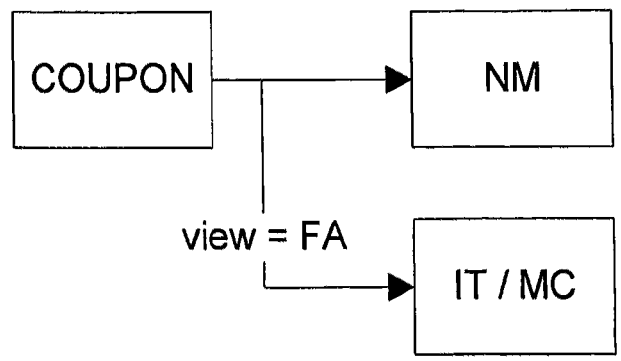
Figure 12K
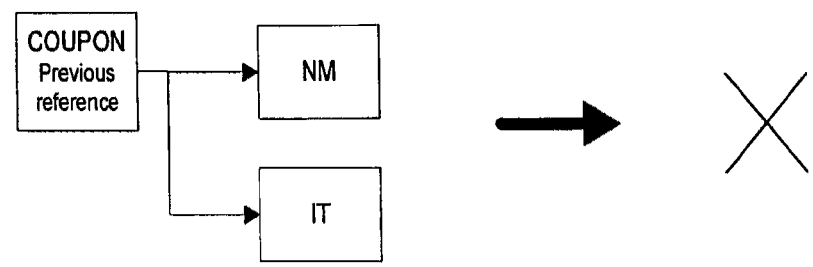
OR
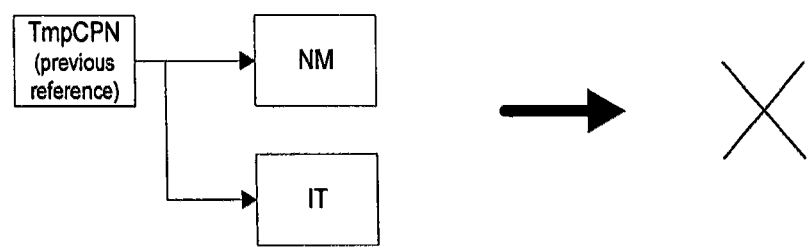
Figure 12L

DE-SYNCHRONIZATION MONITORING SYSTEM AND METHOD

TECHNICAL FIELD

The exemplary embodiments of this invention relate generally to travel reservation methods and systems and, more specifically, relate to services that inform an agent of a de-synchronization that occurs between a particular reservation image and a corresponding electronic ticket (E-Ticket) or other document.

BACKGROUND

Various concepts used in the travel industry are herewith discussed as an aid in understanding the technical basis of the invention.

Passenger Name Record (PNR): A PNR is a record in the database of a computer reservation system that contains the itinerary for a passenger or a group of passengers.

Passenger Name Record (PNR) Product: In the following description every value-based element in the PNR is referred to as a PNR product. This includes, for example, AIR segments, a special service request (SSR) chargeable, airline services and ticketing fees (TSM), hotel and car reservations.

Electronic Document: Electronic documents (e-documents) are said to be associated to products when paid by the passenger. Depending on the type of the product an e-document can be an electronic ticket (an E-Ticket for AIR segments) or an EMCO (for SSR chargeable and TSM).

Electronic Ticket (E-Ticket): An E-Ticket is a document issued by the airline or travel agent once the passenger confirms and pays for the reservation. The E-Ticket is created based on the information of the reservation, such as the flight details (class, date, boarding point, etc), the passenger name, form of payment, etc. Upon the issuance of the E-Ticket every flight segment in the reservation is said to be associated to an E-Ticket coupon. Reference in this regard can be made to the non-limiting example shown in FIG. 1A.

Once issued the E-Ticket is stored in a separate database (different from the reservation database that stores the PNR) and is controlled by a separate system, the ETS (Electronic Ticketing Server). Only the number of the E-Ticket appears on the reservation image. As a result, and if the agent needs the details of the E-Ticket, the details can be retrieved from the ETS. This is a done through a query appropriately called an "E-Ticket display request".

E-Ticket and Reservation de-synchronization: However, once the E-ticket is created any change made to the flight details of the reservation will not be reflected directly on the E-Ticket as there is currently no automatic process to accomplish this task. The agent thus is required to update manually the E-Ticket with the latest changes, otherwise the document and the reservation will be de-synchronized, and the segment and its corresponding coupon become an "orphan", i.e., not associated with a coupon. Reference in this regard can be made to the example shown in FIG. 1B.

A de-synchronization can result, for example, due to the following sequence of actions. A passenger books an airline flight in economy class, and then subsequently rebooks in first class. When the rebooking is completed the associated PNR is modified, however the E-ticket or coupon may be not modified. The passenger could possibly, in this circumstance, be able to fly in first class while the airline does not collect the fee for the class upgrade. In order to have the class upgrade paid, the agent may ask for a re-book in order to modify the image of the PNR. He may also reissue the E-ticket which will trigger a re-pricing operation. However, such actions may not always be done by travel agents.

Orphan Product: A product is considered as an orphan when it is not associated with any Electronic Document. For an AIR segment product this can occur when an agent rebooks the segment without updating the corresponding E-Ticket (thus generating a de-synchronization). On the other hand, the SSR chargeable and fees-related products are orphan as long as the fees/penalties are not paid by the passenger. In fact, paying the fees creates and associates the Electronic Document to the corresponding product.

DCS Window: This is the time when a Departure Control System (DCS) needs to have all of the passengers and ticket information linked to a particular flight. This information is used to perform passenger check-in and the boarding of passengers onto the plane.

PNL: The Passenger Name List (PNL) is a file that contains all passenger data related to a flight. The PNL is sent to the DCS.

An important objective of airlines is to reduce cost and maximize benefits for air carriers and other entities that employ electronic ticketing and travel reservation services. This objective is at least partly achieved by striving to attain the following goals:

(1) 100% Electronic Ticketing, as the distribution of paper tickets is many times more costly.

(2) 100% Integrity on Revenues, i.e., no misusage of fare rules by passengers and no loss of information during disruptions.

(3) 100% Self-Service Check-in, i.e., minimize the number of agents at the airport in order to further reduce operational costs.

Related to the foregoing is a goal that all passengers be travel-ready at check-in time. However, with the generalization of electronic ticketing the lack of an automatic synchronization technique between the E-Ticket and the passenger's itinerary is becoming an increasingly important issue for airlines, one that can prevent the achievement of objectives 2 and 3. The occurrence of a de-synchronization event requires manual effort at check-in and can result in an under-collection of the associated fee.

SUMMARY

The foregoing and other problems are overcome, and other advantages are realized, in accordance with the embodiments of this invention.

In exemplary aspects there of the invention provides a method and a system to analyze passenger name records (PNRs) stored in a PNR database (DB). The method includes automatically analyzing each action performed on a PNR stored in the PNR DB; when an action results in an occurrence of a de-synchronization event between the PNR and a corresponding electronic ticket, automatically changing a status in the PNR from Established to Orphan; and if the final status of the PNR is determined to be Orphan, setting a flag in the PNR to enable at least the display of information to an agent, where the displayed information is based on data included in the PNR and is displayed automatically to an agent, and at least indicates the occurrence of the de-synchronization event and a reason for the occurrence of the de-synchronization event.

Another aspect the invention relates to a non-transitory computer-readable medium that contains software program instructions, where execution of the software program instructions by at least one data processor results in performance of operations that comprise execution of the method as in any one of previous steps and features.

According to another aspect, the invention relates to a computer-implemented travel reservation system comprising a passenger name record (PNR) database (DB), and further comprising an analyzer configured to automatically analyze each action performed on a PNR stored in the PNR DB and to, when an action results in an occurrence of a de-synchronization event between the PNR and a corresponding electronic ticket, automatically change a status in the PNR from Established to Orphan, said analyzer being further configured to determine if a final status of the PNR is Orphan to set a flag in the PNR to enable at least the display of information to an agent, where the displayed information is based on data included in the PNR and is displayed automatically to an agent, and at least indicates the occurrence of the de-synchronization event and a reason for the occurrence of the de-synchronization event.

Although the present invention is particularly advantageous when applied to the airline industry, its scope extends to other transportation modes such as train, bus or boat transportation modalities.

BRIEF DESCRIPTION OF THE DRAWINGS

The foregoing and other aspects of the embodiments of this invention are made more evident in the following Detailed Description, when read in conjunction with the attached Drawing Figures, wherein:

FIG. 1C shows a conventional ETIC approach.

FIGS. 1D through 5 are descriptive of a system and method disclosed in commonly owned U.S. Pat. No. 7,809,593, where FIG. 1D depicts a computing environment in which electronic ticketing takes place;

FIG. 2 describes the global architecture of an E-ticket reconciliation service (ERS) according to the invention disclosed in U.S. Pat. No. 7,809,593;

FIG. 3 shows various kinds of link statuses considered by the link matrix of ERS;

FIG. 4 is flow chart of operations performed by the ERS to accomplish reconciliation between PNR segments and E-ticket coupons; and FIG. 5 describes how a matching process is performed by the ERS between orphan segments of a PNR and orphan coupons of corresponding E-ticket.

FIG. 8 shows an example of the result of a Ticketing Diagnostic Display (TDD) request for a certain passenger.

FIG. 10 shows an example of an Unmatched List display for a particular flight.

FIGS. 12A through 12L are useful when explaining various non-limiting examples of processing performed using the ETIC Cell of FIG. 11.

DETAILED DESCRIPTION

Figure 1A:
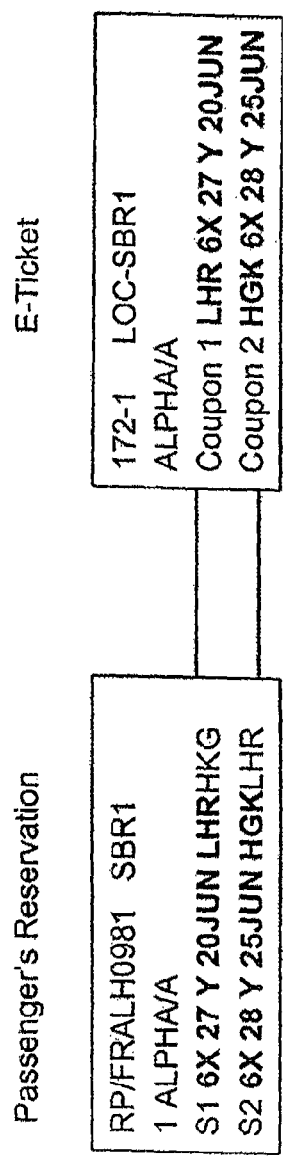
FIGS. 1A and 1B show an association of a passenger's reservation and an E-Ticket.
Figure 1B:
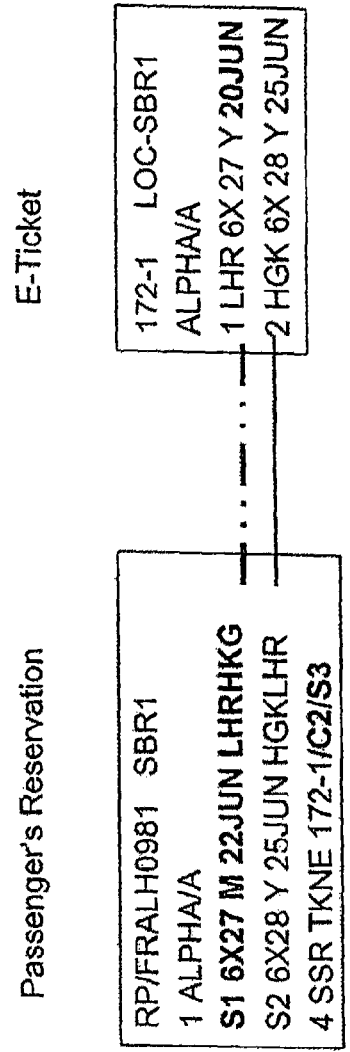

Before detailing the invention, one of its main aspects and some advantageous embodiments are recalled and presented below. As indicated above, the invention relates to a method to analyze passenger name records (PNRs) stored in a PNR database (DB), comprising steps of: automatically analyzing each action performed on a PNR stored in the PNR DB; when an action results in an occurrence of a de-synchronization event between the PNR and a corresponding electronic ticket, automatically changing a status in the PNR from Established to Orphan; and if a final status of the PNR is determined to be Orphan, setting a flag in the PNR to enable at least the display of information to an agent, where the displayed information is based on data included in the PNR and is displayed automatically to an agent, and at least indicates the occurrence of the de-synchronization event and all actions performed on the PNR.

The method allows saving in the PNR database all actions that are performed by the agent and determining in real-time if the PNR comprises a de-synchronization.

Therefore, the invention allows a real-time monitoring and analysis of the actions performs on each PNR while limiting the required processing time and workload and while limiting the risk of technical failure.

Indeed, the steps of automatically analyzing each action performed on a PNR and analyzing whether a de-synchronization occurred are not time consuming or CPU consuming. They do not need any additional information that must be retrieved from outside the reservation system contrarily to existing solutions which require retrieving data from the e-ticket system. This aspect of the invention is all the more advantageous as the reservation system and the e-ticket system ETKT are often remotely located and are run by distinct entities such as a GDS and an airline. Thus, is case of network disruption between the reservation system and the e-ticket server, the invention still allows monitoring the PNR contrarily to solutions based on a comparison between data stored in these two systems.

As all actions that are performed are saved in a matrix of the PNR database hold by the reservation system, it is then possible for an agent to understand how a PNR became orphan. Necessary modifications to re-synchronize the PNR are thus much easier than with previous solutions wherein there is no possibility to know the previous actions that led to an orphan status.

Optionally, the invention may comprise at least one of the following non limitative features and steps:

According to a preferred embodiment, analyzing comprises considering PNR cells each having as elements an origin linked to a passenger target and to a product target, and if there is no data for one of these elements setting its value to temporary.

Preferably, the origin is one of a temporary coupon or a coupon.

According to a preferred embodiment, the final status is determined in response to an agent entering an end of transaction to indicate that the agent has completed performing actions on the PNR.

Preferably, the flag is set in the PNR prior to storage of the PNR in the PNR DB.

According to a preferred embodiment, the information is displayed automatically to the agent in response to the flag being set a next time that the PNR is accessed from the PNR DB.

Preferably, the information indicates at least a reason for the occurrence of the de-synchronization event.

According to a preferred embodiment, the reason for the occurrence of the de-synchronization event is sufficient to permit the agent to perform a manual reconciliation of the de-synchronization event.

According to a preferred embodiment, when an action has resulted in an occurrence of a de-synchronization event between the PNR and a corresponding electronic ticket, and once the status in the PNR has been changed from Established to Orphan; then, whatever are the actions subsequent to the action that resulted in changing the status in the PNR from Established to Orphan, maintaining the status Orphan until receiving from the agent an end of transaction to indicate that the agent has completed performing actions on the PNR; then determining if there is still a de-synchronization event between the PNR and the corresponding electronic ticket; if there is still a de-synchronization event between the PNR and the corresponding electronic ticket, then maintaining the status Orphan otherwise setting the status to Established.

This feature allows reducing significantly the processing time and the workload of the processing means. Indeed, the analyze of the status of the PNR is interrupted upon identification of a first de-synchronization. Then a final analyze is performed when receiving an end of transaction. According to the preferred embodiment, all intermediate actions, i.e., action occurring further to a first de-synchronization, are stored but are not analyzed.

Preferably, the information is used to provide to the agent upon request a ticketing diagnostic that indicates, for a particular passenger, any documents and products that are Orphan.

According to a preferred embodiment, the information is used to provide to the agent upon request a list of all PNRs in the PNR DB that are associated with a particular flight and that require manual resolution of de-synchronization events.

According to another embodiment, the information is used to provide to the agent, when a particular flight is entering a departure control system (DCS) window, a passenger name list (PNL) by automatically triggering the ticketing diagnostic to provide the agent with a list of those PNRs having either a de-synchronization event indicated with an electronic ticket or an unpaid service indicated.

By way of introduction, reference is made to FIG. 1C for showing what may be referred to as a conventional ETIC approach. An agent using an agent terminal requests (1) a PNR from a database (DB) of a reservation system (RES), e.g., a GDS; retrieves the PNR (2); and modifies the PNR (3). At (4) an ETIC synchronization system retrieves the PNR from the RES, and at (4') the ETIC synchronization system retrieves the image of the PNR from an E-ticket system (ETKTS). At (5) and (5"), when a synchronization solution is found by the ETIC synchronization system through modifying the PNR, the PNR is changed and the RES pushes the modified PNR to the ETKTS. At (5'), when the synchronization solution is found by the ETIC synchronization system through modifying the PNR image, then the PNR is revalidated in the ETKTS.

Basically the ETIC module compares the E-ticket DB and the RES DB. When a de-synchronization is detected the ETIC module attempts to reconcile the information in the two DBs. However, this operation of the ETIC module is typically stateless. Thus, if the ETIC module does not manage to reconcile a PNR and the image of the PNR then the agent has no knowledge of the occurrence of the de-synchronization event. Further, the agent cannot see the work done by the ETIC module, and it is not possible at the ETIC module to see the actions that were taken by an agent and that led to the de-synchronization event.

The use of the exemplary embodiments of this invention addresses and solves the problems discussed above. First, the use of the exemplary embodiments reduces considerably the manual effort required at the airport. By providing diagnostic information to agents about known divergences, all necessary information can be provided for aiding the agent in Ticket/Segment reconciliation. This aids in achieving the third goal (C) above.

Further, by automatically providing alerts on divergences an affected passenger can be inhibited from boarding until all outstanding divergences have been resolved. Solving the divergence(s) can result in, for example, the payment of additional fees for rebooking to a higher fare or the payment of outstanding fees for onboard services (SSRs), thus insuring achieving the second goal (B) above.

Before describing in detail the exemplary embodiments of this invention it will be useful to review the description found in commonly owned U.S. Pat. No. 7,809,593, C. Daouk et al., "Method and System for Automatically Keeping Travel Data Consistent Between Passenger Reservation Records and Corresponding Electronic Tickets". Reference in this regard will also be made to FIGS. 1D through 5. This US patent describes in further detail the operation of the ETIC synchronization system that was briefly discussed above with reference to FIG. 1C, and thus is descriptive of the operation of the ETIC module shown in FIG. 1C. U.S. Pat. No. 7,809,593 can be considered to describe an E-ticket reconciliation service (ERS).

Once a reservation is made, an E-ticket thus exists only as a digital record in the computers of the corresponding airline company or in the computers of a global distribution system (GDS), such as AMADEUS, a world-wide service provider for the travel industry and airline companies. The E-ticket is thus a paperless electronic document, a file in a computer, used to represent the purchase of a seat on an aircraft airline, traditionally through a travel agency and also through a website or by telephone. It generally just takes the form of a confirmation number assigned to the passenger, along with the flight number(s), date(s), departure location(s), and destination location(s) of his/her trip. Among many alternate possibilities, this essential travel information can be: printed, e-mailed, forwarded to a mobile device or added to the passenger personal digital assistant calendar application. Hence, when checking in at the airport, passenger has simply to present positive identification to get a boarding pass and have his/her luggage checked.

Figure 1D:
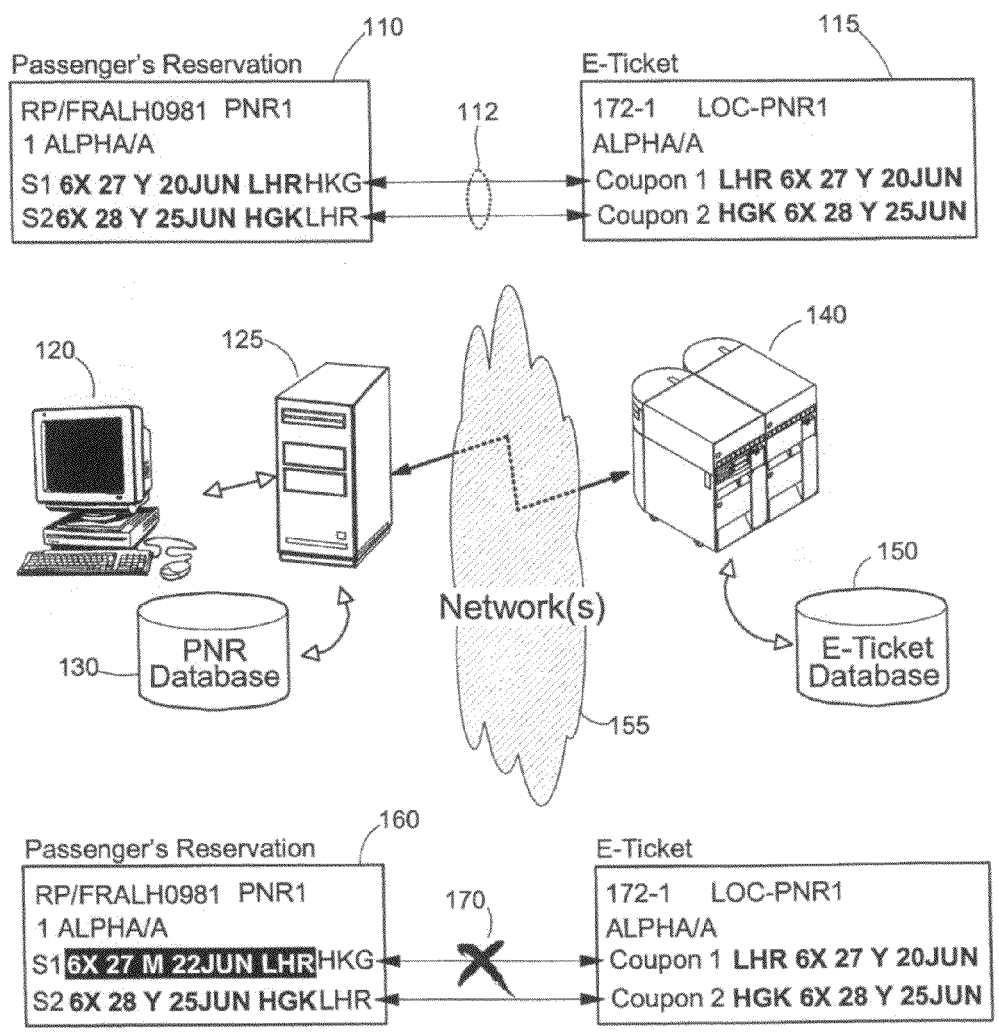

An example of an E-ticketing computerized travel system environment, of the kind put in place by GDSs and other travel providers, is shown in FIG. 1D. In this environment, E-ticket (115) is created on the basis of information provided to a first computer platform (125) by the passenger desiring to make a reservation. Information must include all necessary flight details to complete reservation such as the travel dates, boarding points, flying class and so on, along with the passenger name and address, the form of payment, etc. Passenger reservation (110) is generally referred to as the passenger name record or PNR. All PNRs controlled by a reservation system (125) are held in at least one appropriate database (130). Such a reservation system is traditionally accessed by a travel agent on behalf of a travel agency customer. The advent of the Internet and of its ubiquitous application: the World Wide Web or Web, has however promoted a direct access to reservation systems by end-users of various online travel applications (OLTA). End-users can then book themselves a flight or a complete trip through online travel service providers such as: Opodo®, Expedia® and Travelocity®. In both cases travel information necessary to create the PNR is provided from some sort of client travel software applications either run from a travel agency, by a travel agent on behalf of a customer, or from end-users that typically use Web browsers on their personal computers (120) to access an online travel service application of their choice.

In the computing environment depicted in FIG. 1D, once completed, PNR (110) triggers the creation of a corresponding E-ticket (115) on a separate system, i.e.: an electronic ticketing server or ETS (140). Communications between the various components, i.e.: the reservation platform (125), the electronic ticketing server (140) and the end-users or travel agencies (120) are achieved with traditional means and protocols through a mix of public and private networks (155) including the GDS private network(s) and the Internet. Then, E-ticket is stored in a dedicated database (150) under the control of ETS from where it can be retrieved to be consulted when necessary by the travel agent who has issued the PNR or by the end-user of the corresponding online travel application and, in any case, when passenger checks in at the airport.

In the general case of a reservation (110) there are more than one flight segment per PNR. Each of them is then associated (112) with a corresponding coupon when E-ticket (115) is created. However, once E-ticket is created, any change made to the flight details of the reservation does not automatically trigger a corresponding change of the electronic ticket. Indeed, there is currently no automatic process to complete this task. Hence, the E-ticket must also be manually updated. If the passenger has requested the assistance of a professional in a travel agency it is up to the travel agent to update manually the E-ticket with the requested changes (160). Otherwise, the document and the reservation become de-synchronized, and the segment and its corresponding coupon are orphan, i.e. segment is no longer associated with a coupon (170). De-synchronization thus always requires costly human intervention and can adversely impair check in and boarding, thus greatly offsetting the advantage of having implemented E-ticketing.

The changes done in the reservation can be requested by the passenger. These are voluntary changes, as opposed to involuntary changes initiated by the airline or travel agent. Involuntary changes are, for example, the result of a flight cancellation or of schedule changes. Depending on what commercial policy they apply, airlines and travel providers may require charging penalties for voluntary changes according to a set of predefined calculation rules. The generation of penalties must also be triggered manually prior to the updating of the E-ticket. Moreover, because this is not mandatory, if the travel agent does not launch the corresponding process, the airline will not collect any fee for the reservation change thus impacting airline revenues.

In the very competitive business environment the main corporate objective of all airlines and travel providers is indeed to reduce their operational costs to stay profitable. To this end, electronic ticketing, which is far less costly, is a prime contributor to achieve it provided it can be thoroughly carried out without impairment.

Aspects of the invention described in U.S. Pat. No. 7,809,593 include a method and a system to keep travel data consistent between a database of airline reservations storing passenger name records (PNRs) comprised of travel segments and a database of electronic tickets (E-tickets) comprised of travel coupons, this latter database being independently controlled from a ticketing server. Whenever a travel segment is updated or added in one of the PNRs an electronic reconciliation service (ERS) receives images of updated PNRs. Corresponding E-ticket images are requested by the ERS and received from the database of E-tickets. The then ERS establishes a matrix of links between orphan PNR travel segments and orphan E-ticket travel coupons so that E-ticket orphan travel coupons are re-associated with matching PNR orphan travel segments. After the E-ticket is updated it is revalidated or reissued. Optionally, if applicable, a penalty generator is requested to calculate penalty fees on the basis of changes made to the revalidated or reissued E-tickets. The penalty fees are then attached to the updated PNRs.

Figure 2:
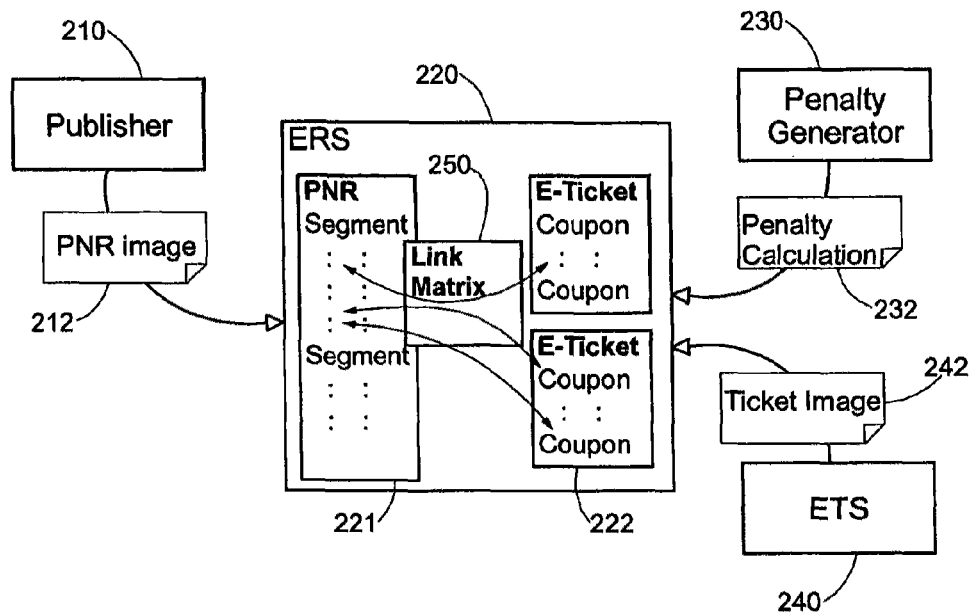

FIG. 2 describes the global architecture of an E-ticket reconciliation service (ERS) according to U.S. Pat. No. 7,809,593 and the interactions with external components such as the penalty generator (230), the electronic ticketing server or ETS (240) and a publisher (210).

The publisher is the component in charge of forwarding PNRs that need to be analyzed by the ERS (220). PNRs are sent under the form of standard messages (212) containing PNR images to the ERS service which extracts from them the proper information so that each newly received PNR can be checked to determine if a reconciliation is actually needed. To this end, in response to a standard request (E-ticket display request/response) issued by the ERS towards the ETS (240), corresponding ticket image (242) is also retrieved and forwarded to the ERS.

Once the ERS (220) has the PNR and E-ticket images (221, 222) it builds a matrix of links (250) between E-ticket orphan coupons and PNR orphan segments, if any. Matching is achieved, when possible, with the help of the exemplary matching algorithm further discussed in FIG. 5.

Figure 3:
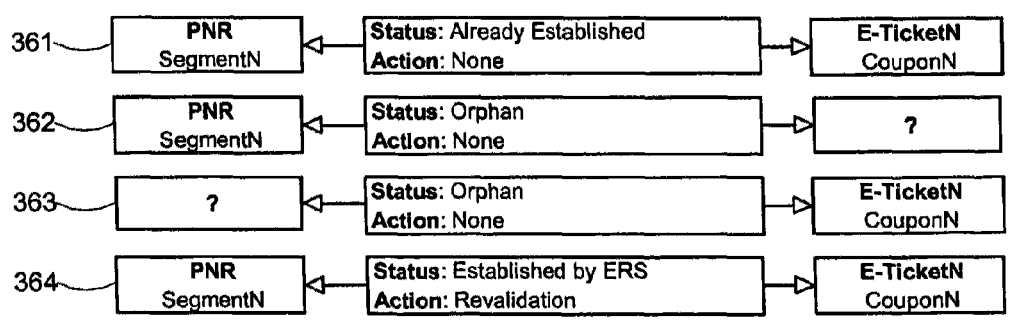

FIG. 3 shows the various kinds of link statuses considered by the ERS link matrix (250) of the previous figure. They are as follows:

If a link is already established (361), i.e., if the link that was created when the E-ticket was first issued or re-issued is still valid nothing is to be done by ERS.

Orphan links are found if a de-synchronization has been introduced between previously associated coupons and segments as a result of PNR changes, or because the PNR contains non-ticketed segments. Hence, a coupon has no corresponding segment (362) or a segment has no corresponding coupon (363). It is the purpose of ERS to repair these links.

Repaired linked have the corresponding status, e.g.: 'established by ERS', after links were automatically revalidated or re-issued (364).

Figure 4:
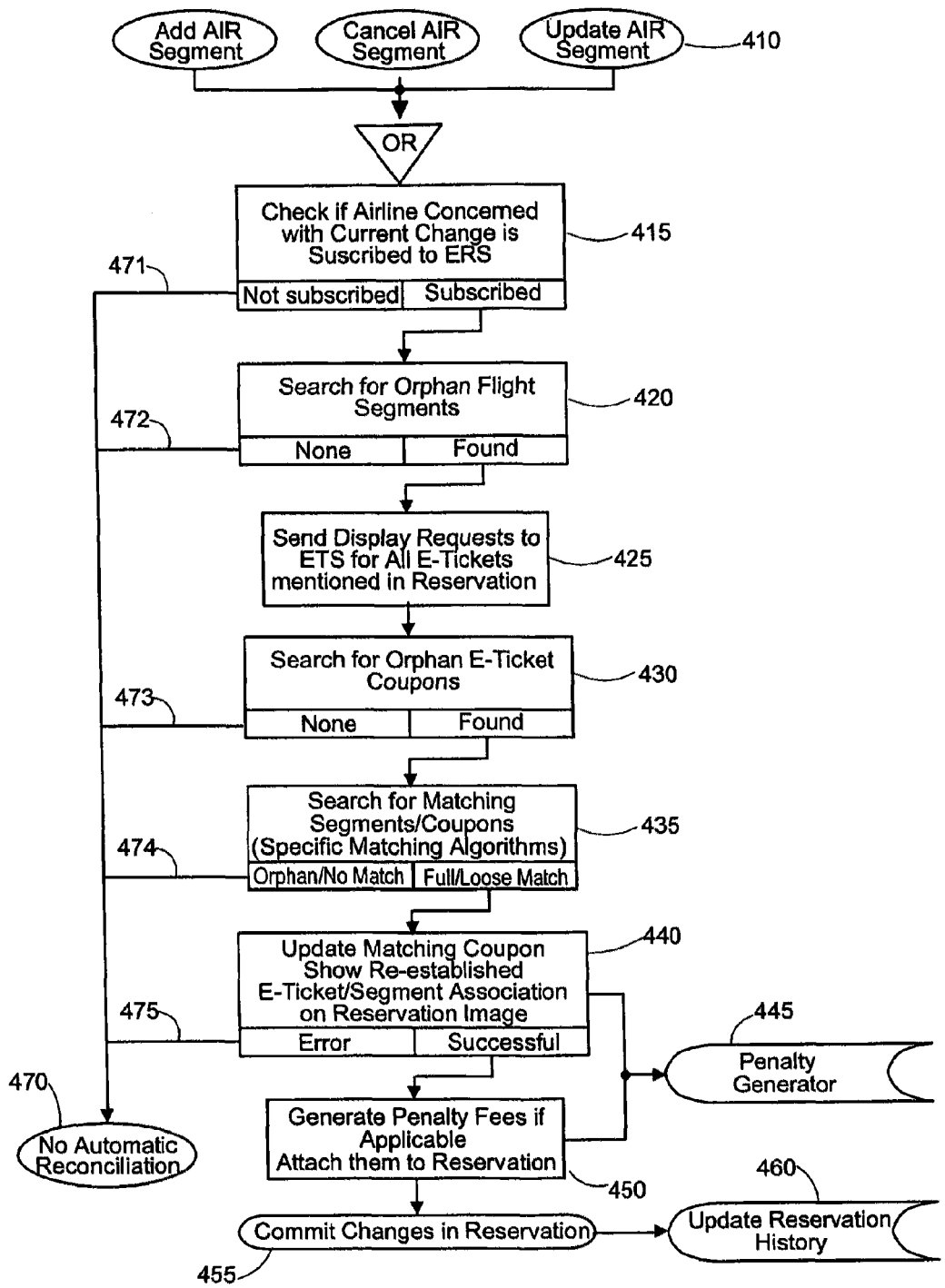

FIG. 4 is a flow chart of operations performed by the ERS while reconciliation of orphan segments and orphan coupons are being performed for each passenger of a PNR.

As discussed with respect to FIG. 2, the publisher (210) observes all transactions performed on a reservation database and triggers the reconciliation service through the sending of a message to the ERS, containing an image of the PNR, each time a reservation is changed. As was also mentioned previously changes are traditionally made by travel agents on behalf of a customer, but can be as well the result of changes requested directly from end-users of online travel applications. Whatever their actual origin, changes to be made to a PNR can be of three types: a PNR air segment is either updated, or cancelled, or an air segment is added (410).

If the airline affected by the change has actually subscribed to the reconciliation service (415) described in U.S. Pat. No. 7,809,593, a search of orphan flight segments is immediately undertaken (420) over the PNR. Otherwise (471), no automatic reconciliation is attempted (470). Typically, the E-ticket reconciliation service described in U.S. Pat. No. 7,809,593 is provided by a GDS, a provider of travel services as previously discussed, to which airline companies may have subscribed or not.

If no orphan flight segments are found (472) no automatic reconciliation is necessary (470). Otherwise, all corresponding E-tickets mentioned in a reservation must be retrieved (425). This is achieved as previously described through the sending of a corresponding request (display request) to the electronic ticketing server (240) shown in FIG. 2 which returns an image of requested E-tickets to the ERS.

Then, the ERS can search for orphan coupons in requested E-tickets (430). If none are found (473), no automatic reconciliation is further attempted (470). Otherwise, matching between orphan segments and orphan coupons is undertaken (435). An example of the matching process is described in FIG. 5. Various matching algorithms can however be applied depending on the particular application. If, after the matching process has been executed, no matching segments/coupons are found (474) no automatic reconciliation can be done (470).

If matching segments and coupons can be found, corresponding re-associations are performed so that the PNR and E-tickets are updated (440). If errors (475) are detected no automatic reconciliation is attempted (470). Otherwise, if successful, and when applicable, penalties are calculated by the penalty generator (445) previously discussed in FIG. 2. Penalties are attached to the reservation (450). Then, changes in reservation are committed (455) and the reservation history updated (460).

As was mentioned, depending on the importance of the changes done to the PNR and rules attached to the initial PNR fare, the E-ticket will be just revalidated or re-issued thus affecting the amount of computed penalties to be attached to the reservation. Inputs of the penalty generator (445) are thus obtained from step (440) so that it can generate and deliver the penalties attached to the reservation (450).

Figure 5:
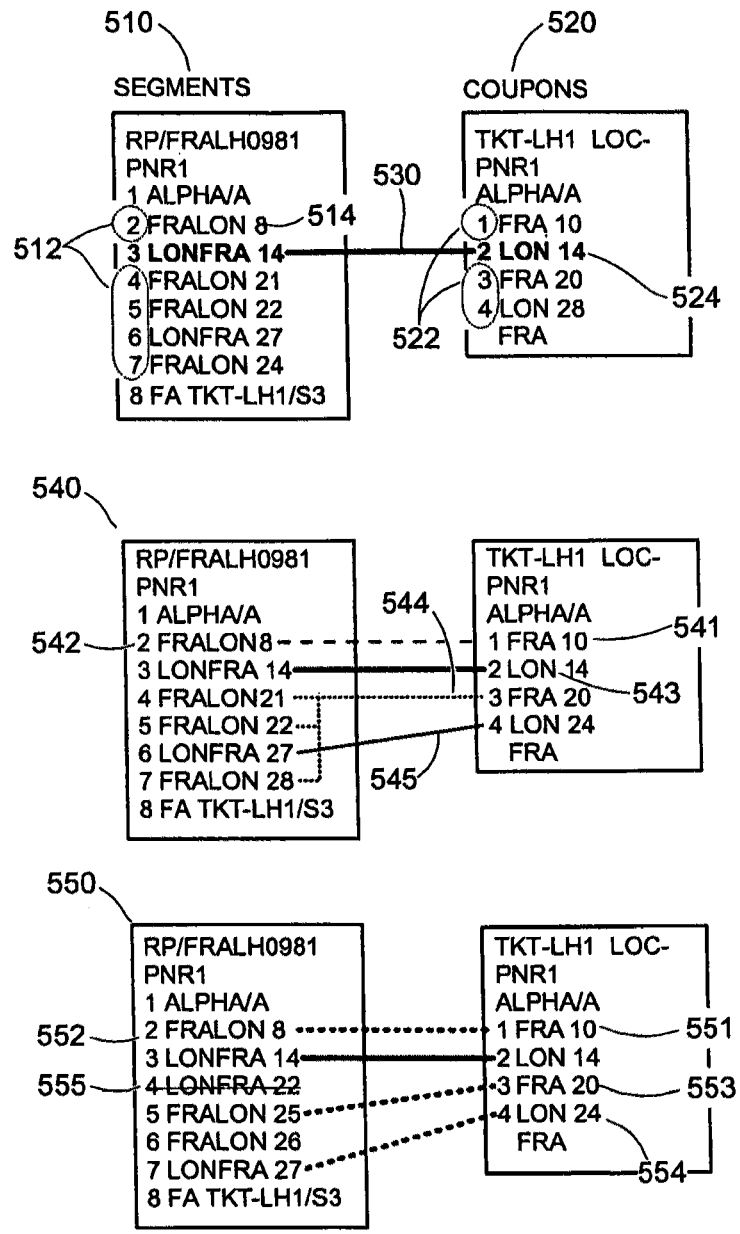

FIG. 5 describes, through an example, how the matching process is performed by the electronic ticket reconciliation service (ERS) described in U.S. Pat. No. 7,809,593 between orphan segments of a PNR (510) and the orphan coupons (520) of a corresponding E-ticket.

In the process of matching orphan segments and coupons the chronological order of the coupons must always be maintained. This implies that a coupon cannot be re-associated with a segment unless its departure date is indeed comprised between the one of the coupon immediately preceding and the date of the coupon that immediately follows. A 'full matching' of coupon and segment is achieved if only their departure dates are different. A 'loose matching' is obtained if the airline, flight number, flight date and/or class of service differ while the airports stay the same, i.e., are within the same city pair. Clearly 'full matching' has precedence over 'loose matching' when the segment and coupons are re-associated by the ERS.

In the example of FIG. 5 the unassociated or orphan segments resulting from changes made to the PNR (510) are those indexed 2 and 4 to 7 (512). The corresponding unassociated or orphan coupons of ticket are at indexes 1, 3 and 4 (522). The associated segment and coupon left is shown in bold characters (530). Coupons are listed in successive order of their departure cities. Hence, in (520), there are four coupons listed. The first one, at index 1, corresponds to a coupon from FRANKFURT, Germany (city code: FRA) to LONDON, United Kingdom (city code: LON). The second one, at index 2, is from LONDON to FRANKFURT and so on.

The first step of the matching process verifies that the chronological order can be maintained after revalidation of the E-ticket. This implies that, for a given orphan coupon, those segments which would change the sequence of E-ticket coupons are invalidated. This is achieved as follows for each orphan coupon:

(a) Find the first preceding coupon still associated with a segment.

(b) Find the first following coupon still associated with a segment.

(c) Then, an initial list of candidate segments for the current orphan coupon is strictly comprised of the segments between the first preceding and the first following associated segments.

In the example of FIG. 5 the orphan coupon at index 1 is still possibly in sequence with the segment at index 2 because the date attached to this segment (514) is 8. This value being less than 14, i.e., the date of the non orphan coupon that immediately follows (524); it is indeed feasible to match the corresponding segment and coupon. The same remark applies to the orphan coupons at indexes 3 and 4, which could match any of the orphan segments at indexes 4 to 7 since their attached dates are greater than 14, i.e., the date of the non orphan coupon (524) that immediately precedes them.

Because the segment and coupons must share the same city pairs the next step of the re-association process checks this property so that routes are actually matching (different airports within the same city give a route matching). For a given coupon the ERS removes segments with different city pairs, if any. The result of this step is a list of candidate segments for each coupon as shown in FIG. 5 (540). In this example the coupon at index 1 (541) and segment at index 2 (542) share a same route noted FRALON, the standard airline shorthand notation for a flight route from FRANKFURT, Germany to LONDON, United Kingdom as already discussed above. Because the coupon assumes that the passenger leaves on day 10 from FRANKFURT for LONDON, i.e., the departure city of the next coupon (543), the routes indeed match. The next orphan coupon at index 3 corresponds also to the same route (FRALON) matching with segments at indexes 4, 5 and 7 (544). Finally, the route of the last orphan coupon at index 4 is found to match with the route of the segment at index 6 (545).

Once the above described checking step of the re-association process is complete the ERS elects only one candidate segment per orphan coupon. Then, for each passenger, the ERS proceeds with each remaining unassociated coupon in chronological order, as in the exemplary following sequence:

If the current coupon considered has only one possible candidate segment and that segment is the candidate of only one coupon it is elected.

Otherwise:

The ERS looks for a coupon perfectly matching the current only possible candidate segment. If such a coupon is indeed found it is elected.

Otherwise:

the first chronological coupon is elected.

However, if current coupon has several candidate segments, and:

if there is no other coupon matching with any of the several candidate segments, then the ERS looks for a segment perfectly matching with the current coupon. If found, this segment is elected.

Otherwise:

the first chronological segment is elected.

As a consequence of the above sequence of processing steps, each time a segment is elected, i.e., re-associated with an orphan coupon, the elected segment, and all preceding ones (not yet elected), are no longer valid candidate segments; thus they are not further considered.

The above sequence is intended to just be a simple example of how the matching algorithm can be operated in the framework of the system and method described in U.S. Pat. No. 7,809,593. Depending on the specific application, especially depending on airline preferences, more sophisticated matching sequences may be considered so that algorithm is overall better adapted to fulfill the particular objectives. The matching algorithm described above can be readily tailored while the overall mode of the operation remains the same.

As a result of this elective process shown through the particular example of FIG. 5 (550), the orphan coupon at index 1 (551), the first to be processed, has only one possible candidate segment (552) to be associated with. Hence, the ERS elects this segment and re-associates it with the current coupon. As mentioned above the just elected segment can no longer be a candidate segment for further re-associations. Then, the matching algorithm proceeds with the next orphan coupon, i.e., the one at index 3 (553). This coupon has two possible candidate segments at indexes 5 and 6, hence the first chronological one is selected, i.e., the one at index 5. Finally, the remaining orphan coupon at index 4 (554) is left with two possible segments to be re-associated with, i.e., the ones at indexes 4 and 7. However, as a result of having already elected the segment at index 5 in the previous step the one at index 4 is no longer a valid candidate and is eliminated (555). Hence, the ERS elects the segment at index 7 to be re-associated with the last orphan coupon (554), which ends the re-association process.

After segments and coupons have been eventually re-associated as a result of the building of the matrix of links (250) shown in FIG. 2 and the exemplary matching process discussed above, penalties to be paid by the passenger for the requested changes are possibly generated by the penalty generator (230) on the basis of a predefined set of rules. Computed penalties will generally depend on the fact that ticket is just revalidated or needs to be re-issued. The decision of re-issuing or revalidating the E-ticket may depend of the amount of the requested changes and also on the fare and the rules attached to the original ticket. In any case, the result of the penalty calculation is returned to the ERS in the form of a corresponding message (232) as shown in FIG. 2.

Having thus reviewed the ETIC-based system and method described in U.S. Pat. No. 7,809,593, various embodiments of a PNR Monitoring System 100 will now be described with reference to FIGS. 6-14.

Figure 6:
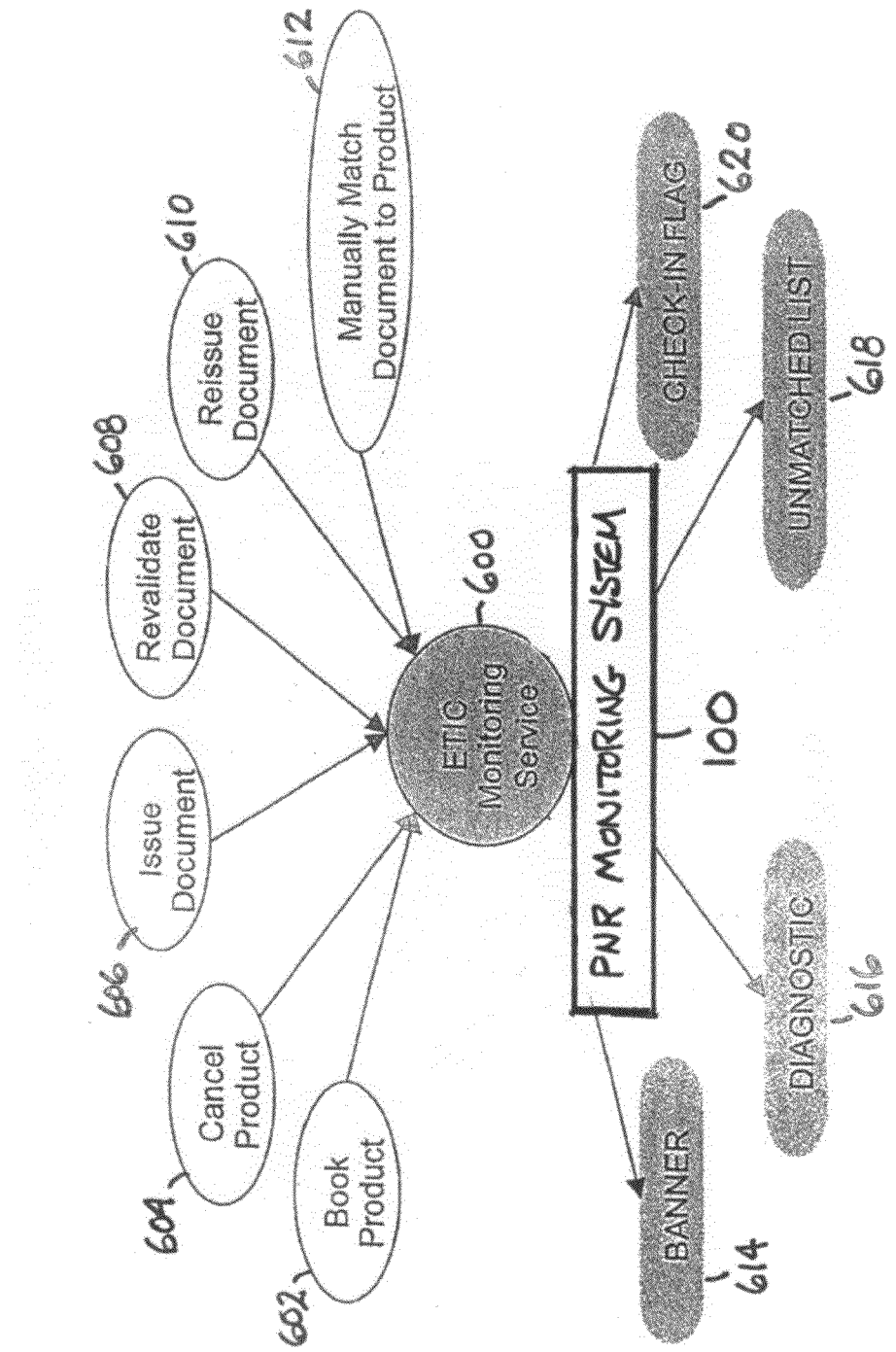
FIG. 6 is an overview of a PNR Monitoring System in accordance with this invention.

In FIG. 6, in accordance with the embodiments of this invention, the PNR Monitoring System 100 is an online synchronous service interfaced with the reservation system that interactively detects the creation and resolution of de-synchronizations between the PNR value-based elements on one hand and the electronic documents on the other hand. An ETIC Monitoring Service 600, which in the exemplary embodiments can be considered to be based on the system described in U.S. Pat. No. 7,809,593, operates in conjunction with the PNR Monitoring System 100. The ETIC Monitoring Service 600 takes as inputs various events, such as book product 602, cancel product 604, issue document 606, re-validate document 608, re-issue document 610 and manually match document to product 612. ETIC Links are modified as needed (as was described above, and will be described in further detail below). The PNR Monitoring System 100 responds to modifications of the ETIC Links to detect an occurrence of a de-synchronization event. Upon the detection of a de-synchronization event the PNR Monitoring System 100 outputs variously an agent display banner (Divergence Banner 614, shown in FIG. 7), a diagnostic or diagnostics 616 (Ticketing Diagnostic Display (TDD), shown in FIG. 8) and an Unmatched List 618 (shown in FIG. 10). A Check-In Flag 620 may optionally be output from (set by) the PNR Monitoring System 100. These various outputs are described now in further detail. Note that hereinafter the ETIC Monitoring Service 600 may be referred to simply as the ETIC.

The Divergence Banner 614 can be considered to be a warning message that appears on a reservation to draw the attention of the agent to the fact that the associated PNR contains at least one de-synchronization that needs resolution. The Divergence Banner 614 is raised automatically and interactively in real-time if any de-synchronization is detected in the PNR. A Banner Raising Module (shown in FIG. 7 as item 702), in cooperation with ETIC Spy module 700 shown in FIG. 7, detects in real-time the creation and resolution of de-synchronizations between the PNR value-based elements on one hand and the electronic documents on the other hand. More specifically, the Divergence Banner 614 can be raised in the following exemplary cases:

(1) An AIR segment was rebooked, and the agent did not update the E-ticket.

(2) Any value-based product was added to the PNR without being paid.

(3) Any value-based product previously associated to an E-document was deleted from the PNR (this action results in an orphan E-Document).

(4) Any E-document was updated, cancelled or added.

(5) A previously waived penalty was un-waived (so that the passenger would be required to pay).

The PNR Monitoring System 100 is designed to be flexible and to meet various needs of the client (airline). As such the types of documents and products that are taken into account for the raising and clearing of the Divergence Banner 614 can differ depending on the airline. For example, some airlines require monitoring only the ticketed PNR, while others are interested in all PNRs. This can be driven by a set of Business Rules.

The Divergence Banner 614 is saved in the PNR and corresponds to at least one bit that can be set or reset. If the bit is set, the warning message (the Divergence Banner display) that appears on the reservation screen of the agent can be changed depending on the office/airline preferences.

Figure 7:
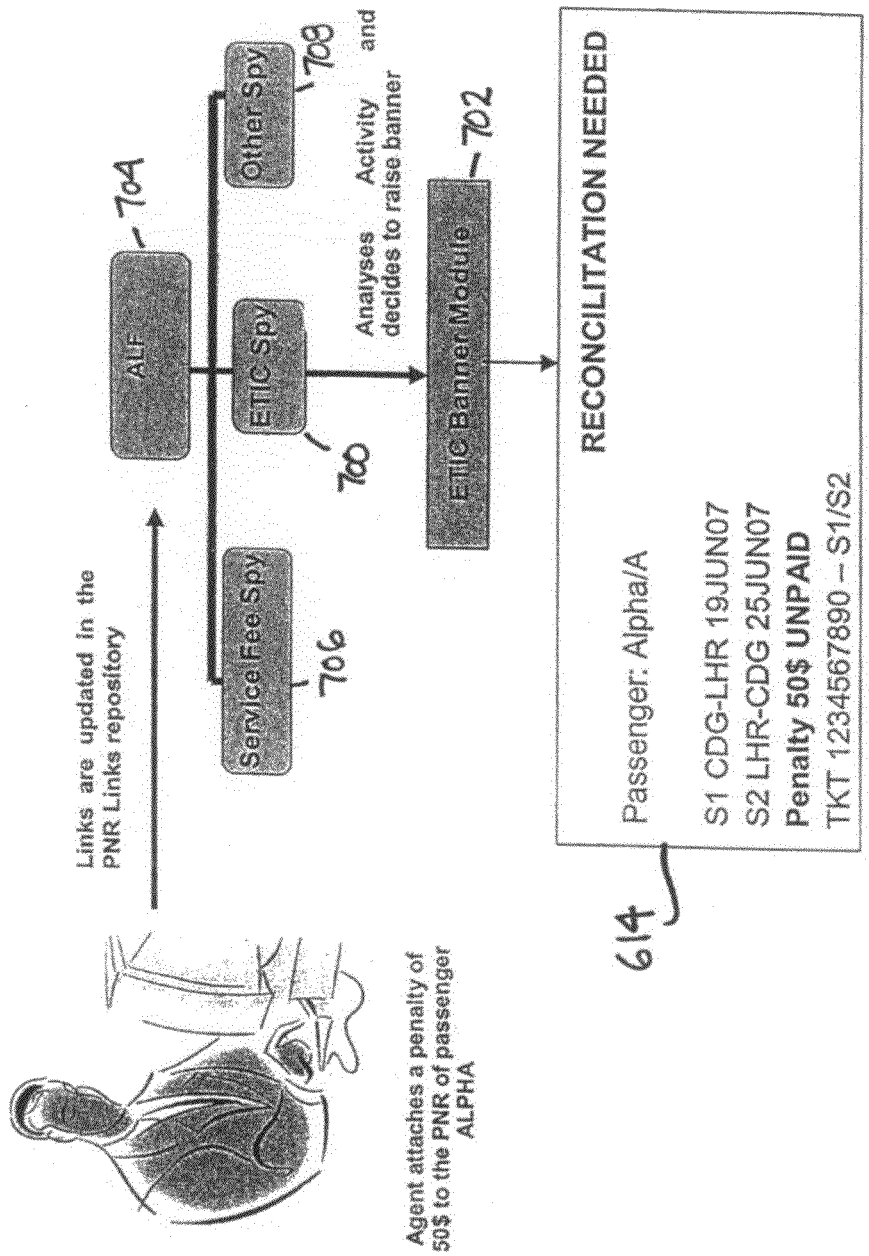
FIG. 7 presents an example of the raising of a Divergence Banner upon the addition of a product to a reservation.

Referring to FIG. 7, in one exemplary embodiment the raising of the Divergence Banner 614 can be based on a module/process which can be referred to for convenience as an ETIC Spy 700. This module analyses all of the changes made in the PNR. More specifically the ETIC Spy 700 analyzes the links between the different elements in the PNR. Since the ETIC is interested only in the product/document links, in case the ETIC Spy 700 finds an activity that affects this family of links it can call, in this exemplary embodiment, the ETIC Banner Raising Module 702 for further analysis. The ETIC Banner Raising Module 702 analyzes the activity for which it was triggered, and if it finds that a product/document link was broken (due to the introduction of a de-synchronization or simply by the addition of an Orphan product) it sets the bit corresponding to the Divergence Banner 614 in the PNR.

In the example of FIG. 7 an agent attaches a penalty of 50$ to the PNR of passenger ALPHA. In response links are updated in a PNR Links repository (ALF 704). The ETIC Spy 700, possibly in cooperation with other modules (Service Fee Spy 706, Other Spy 708) analyses the activity and determines whether the Divergence Banner 614 may need to be raised. The ETIC Banner Module 702 responds by composing an appropriate content for the Divergence Banner 614, based at least in part on information contained in the affected ETIC links, and raises it (displays it to the agent). In this non-limiting example the Divergence Banner 614 could state:
RECONCILITATION NEEDED
Passenger: Alpha/A
S1 CDG-LHR 19 JUN7
S2 LHR-CDG 25 JUN7 Penalty 50$ UNPAID TKT 1234567890-S1/S2

It can be noted that the process of clearing the Divergence Banner 614 once raised can be more complex than actually raising the banner. In fact, to determine whether the Divergence Banner 614 needs to be raised or not raised, it is sufficient to study the last action that was performed on the PNR (e.g., a penalty was added to the PNR as in FIG. 7). The clearance can be more complex because it preferably should analyze all of the products/documents links to determine whether or not they are all properly established. If so (e.g., there are no remaining Orphan links) then the Divergence Banner 614 can be lowered (the bit set in the PNR can be reset).

The above-noted example of the ETIC Spy 700 may be considered to include some or all of the functionality of the PNR Monitoring System 100.

Discussed now is a Ticketing Diagnostic Display (TDD) feature. This feature gives a detailed view to the agent of all de-synchronizations contained in the PNR. The TDD entry can have different options:

Airline: when provided, this option limits the diagnostic to the products and fees of that airline. However all electronic tickets are diagnosed regardless of their Validating Carrier.

Segment(s): when provided, this option limits the diagnostic to segment(s) and their associated fees.

Passenger(s): when provided, this option limits the diagnostic to the products and fees associated to this passenger(s).

FIG. 8 shows an example of the result of a TDD request for a passenger ALPHA. With this information the agent can easily see the documents and products that are Orphan and the agent can attempt to perform a manual re-association.

It is also within the scope of the exemplary embodiments to provide the agent with hints on the best way to re-associate the orphan elements. This can be done based on an algorithm that allows finding, among a list of available segments, the best candidate segment for a given coupon in order to re-associate the matched segment and coupon (revalidation or reissue).

Upon reception of a TDD request a TDD service analyses the PNR and builds an ETIC Link Matrix. The ETIC Link Matrix corresponds to the group of all links between products (Air segments, SSR, TSM, etc.) and the coupons of documents (E-Ticket coupons, MCO (Miscellaneous Charges Order) coupons, etc.) for a given passenger and within a given PNR.

Figure 9A:
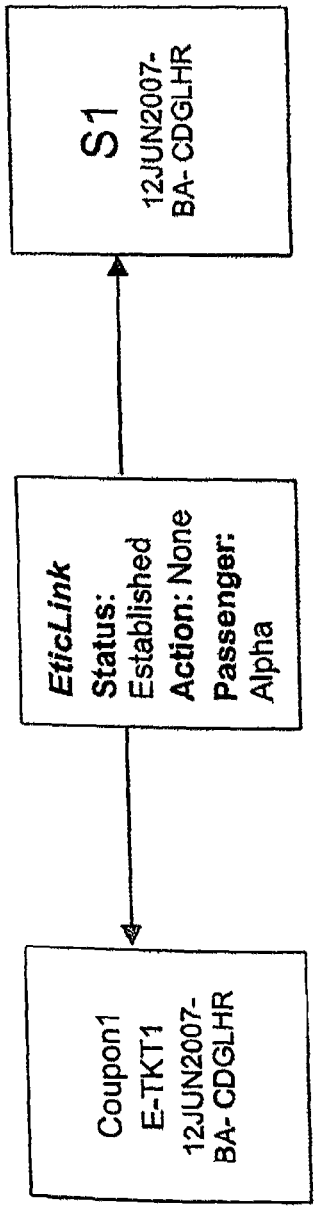
FIGS. 9A-9D show various possible status conditions for an ETIC Link.
Figure 9B:
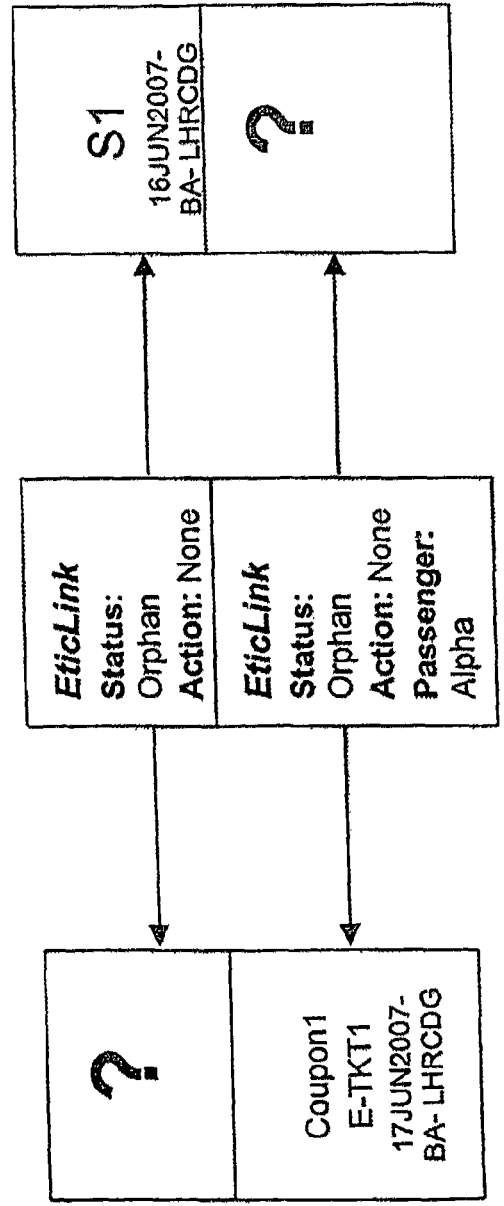
Figure 9C:
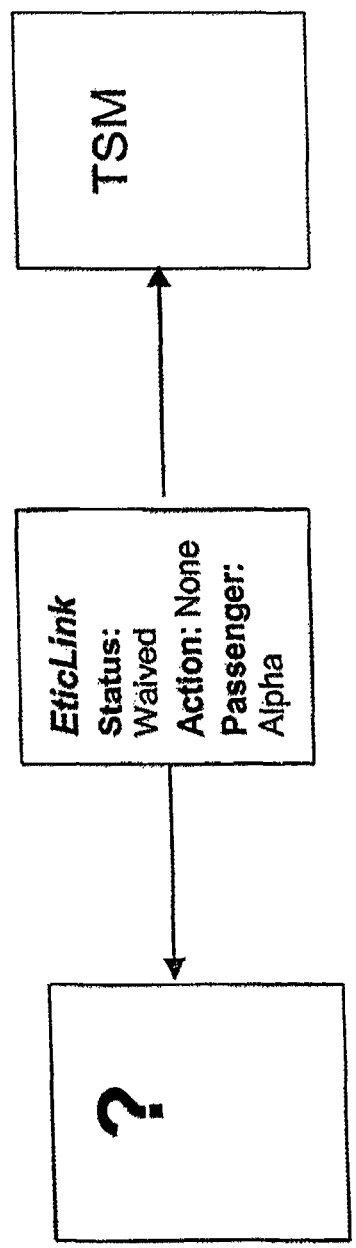
Figure 9D:
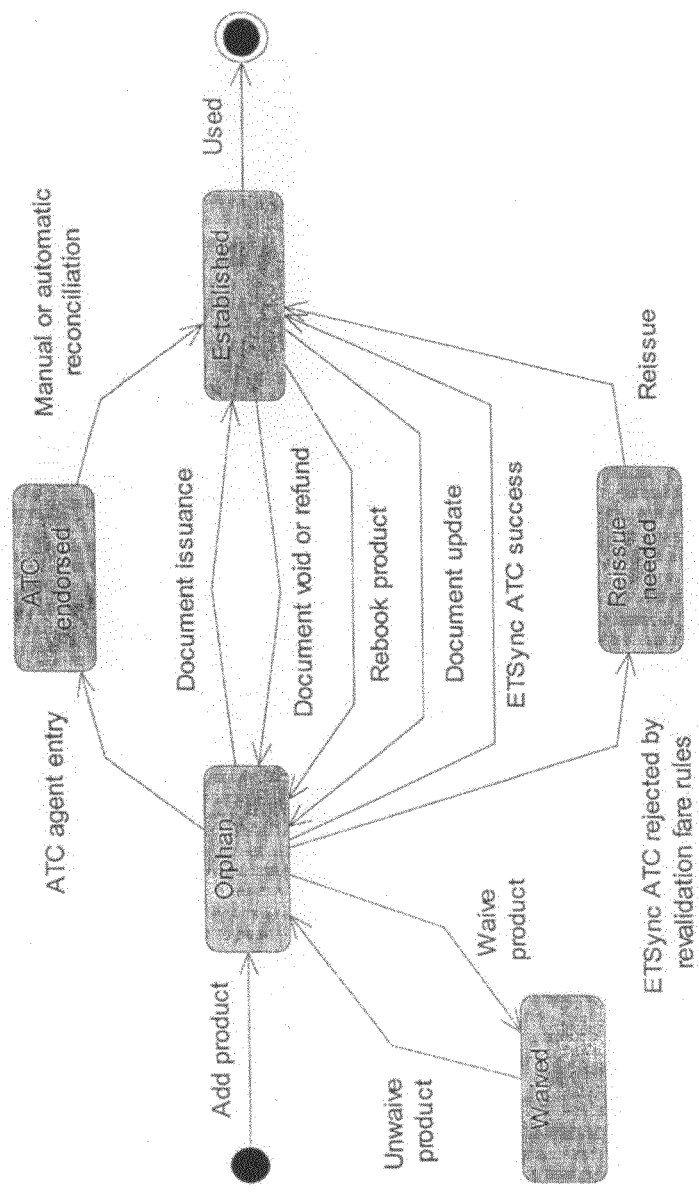
Figure 11:
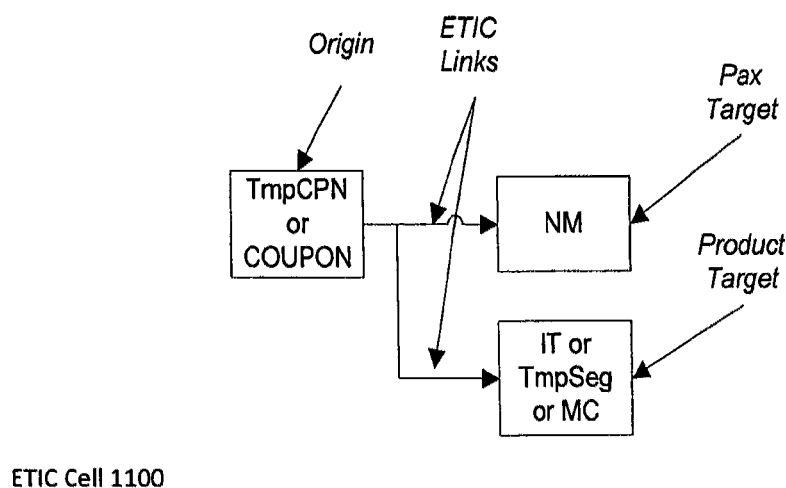
FIG. 11 is a depiction of an ETIC Cell.

An ETIC Link can have one of a number of possible status conditions, shown in FIGS. 9A-9C, as well as in FIG. 9D.

A first status is Established (FIG. 9A). This is the case when the links are already established without any operation from the ETIC. All links that are created automatically upon the issuance of a document have this type of status.

A second status is Orphan (FIG. 9B). This is the case when a de-synchronization between previously associated coupons and segments is introduced, or when the PNR contains Orphan documents or products. The presence of these links in the Link Matrix raises the flag for the ETIC Banner 614 (described above), and the TDD functionality then corresponds to a view of those links.

A third status is Waived (FIG. 9C). This status is used when the airline agent decides to waive a penalty fee. When the status is set to Waived instead of Orphan one can ignore the fact that the product (TSM) is not associated to any document (MCO) and thus that the penalty has not yet been paid.

FIG. 9D, which may be viewed as a state machine implementation, shows various possible interconnections between these status conditions. Also shown is an ATC Endorsed status and a Reissue Needed status, both of which are entered via the Orphan status and both of which can lead to the Established status. As can be seen the Link Status follows a strict, well defined flow that enables the extraction of a clear diagnostic of the PNR/Ticket synchronization. ATC stands for Amadeus® Ticket Changer. This product offers to travel agents an automated flow to exchange tickets, with automated penalty/refund calculation based on Airline fare rules. In FIG. 9D, a distinction is made between an ATC action handled by a "robot" performing electronic ticket synchronization, and an ATC action that is manually requested by a travel agent. In particular, in case of an electronic ticket synchronization ATC revalidation failure, a record is made of this status to propose to the PNR Monitoring user a status suggesting using a re-issuance operation to resolve the de synchronization.

All of the product/document links, whether Orphan or Established, have a reference to the Passenger. Once the Link Matrix is built, the TDD service sends in the response to the TDD request at least a part of these links, depending on the option specified in the request (e.g., if the passenger name is specified then only the links of that passenger are sent, if the airline is specified then only the links having a document or product of that airline are sent). The response is then formatted to show the agent in a user friendly way the information that the agent requested. FIG. 8 is one example of the TDD response for the passenger Alpha.

The use of the Unmatched List 618 is an efficient method that can be used to assist desk agents of the airline, prior to flight departure, to obtain the list of PNRs that require manual resolution of de-synchronizations. This feature displays a list of all passenger names for a given flight number and date in which a PNR segment is not synchronized with a coupon. FIG. 10 shows an example of an Unmatched List display for a particular flight on a particular day.

If the agent needs more detail on the divergences for a particular passenger the agent can perform a TDD request while specifying the passenger name. As described above with reference to FIG. 8, this will provide the agent with a list of all unassociated segments and products and facilitates the agent's task of making a manual re-association.

Divergence indicators stored in the PNR are also stored in the index of all bookings, typically the GDS bookings. This index is used to compute the result of all "PNR list" entries, in particular the unmatched list.

Discussed now is the Check-In Flag 620. At the time a flight is entered in the DCS Window a PNL is created and sent to the DCS. The process which creates the PNL triggers an Unmatched List process to get those PNRs which have either a de-synchronization with an E-Ticket or an unpaid service (e.g., penalty fees, SSR chargeable, etc.) On each unmatched PNR the process triggers a TDD, applies a filter on discrepancies concerning the flight that is entering the DCS Window and adds to the PNL the resulting information in order to inform the DCS agent. Non-limiting examples of how PNL may appear can be:

John/2200123456789/21*FULL MATCH
John's Ticket 2200123456789, Coupon 2 is in Full Match (no de-synchronization)
John12200123456789l*REISSUE NEEDED
John's Ticket 2200123456789, is unmatched and must be exchanged
John/PENALTY FEE/*UNPAID 200 EUR John has not paid a penalty fee of 200 euros, due to a previous ticket revalidation or exchange.

John/VGML/*UNPAID 20 EUR

John has not paid a Vegetarian meal fee of 20 euros that has been booked on the reservation record.

Further details with respect to the building of the ETIC Link Matrix are now provided.

A number of PNR activities are monitored. Basically, any action that could lead to a ticket de-synchronization between the PNR and the Ticketing Servers is monitored and leads to a call of a dedicated callback. An exemplary list of monitored PNR activities is as follows:

Name Element Add (only for Group PNRs)
Name Element Cancel
Itinerary Add (added segment)
Itinerary Change (Status Code Change)
Itinerary Cancel
Itinerary Delete
FA Add (including FA subtype inside a MCO) FA=a fare element.
FA Change (Status change for paper void/refund)
FA Cancel (including FA subtype inside a MCO)
FH Add
FH Cancel
SSR Add (SSR TKNx and INFT only)
SSR Cancel (SSR TKNx and INFT only)
MCO Add (only for monitored ones) (MSC=miscellaneous document)
MCO Change (Including RFIC Change, FA or FH add and cancel)
MCO Cancel
MCO PDE Links Update (pax (passenger) and/or segment re-association)
PNR Split Before discussing the detailed processing for a few of these PNR activities it will be useful to explain with reference to FIG. 11 the concept of an ETIC Cell 1100.

The base element used in electronic ticket synchronization (ETSync) to monitor a couple (pax (passenger), monitored product) and/or Tickets is the ETIC Cell 1100. In the ETIC model a couple (pax, monitored product) are associated with one and only one ETIC Cell 1100 at a time.

An ETIC Cell 1100 is composed of:
a Coupon Origin;
a Pax Target;
a Product Target; and
ETIC links to associate the Origin and the Targets.

Possible origins of an ETIC Cell 1100 are:
TmpCPN: Temporary Coupon (no Coupon associated with pax and segment); and
COUPON: A Ticket associated with the pax and the monitored product in the PNR. An ETIC Coupon element with the same identifier holds details about this Ticket.

Possible Product Targets are:
TmpSeg: Temporary Segment (Coupon not/no longer associated to a segment);
IT: Flight Segment; and
MC: MCO.

An ETIC Cell 1100 is always associated to a defined pax (NM, name) during all of its life.

The ETIC Links within the ETIC Cell 1100 hold the same value for the following attributes: (A) Link Status (status of match), in this case Established (Full Match); Orphan; Manually Established; and Waived (only for MCO); (B) View Type (fare element type that created the link); and (C) Reason For De-synchronization (nature of operation): Voluntary or Involuntary.

If the origin of the ETIC Cell 1100 is a COUPON, an ETIC Coupon Element necessarily exists with same identifier and holds the following information: Air Prefix, Ticket Number, Sequence Number, Coupon Type (T for TST and M for TSM), Type (Electronic or Paper).

In general, all newly created ETIC Links have by default their Reason For Desync field set to Voluntary, to highlight that they are built during a Voluntary operation.

An Orphan Segment or MCO is represented as an ETIC Cell 1100 with origin TmpCPN and product target as IT or MC. In this case, the ETIC Links have the following attributes: Status: Orphan (No match) (Waived if explicitly mentioned for MCO); View type: No view (No fare element created); and Reason for De-synchronization: previous value kept, or Voluntary if new Link.

An Orphan Coupon is represented as an ETIC Cell 1100 with origin COUPON and product target TmpSeg. In this case, the ETIC Links have the following attributes: Status: Orphan (No match); View type: No view (No fare element created); Reason for De-synchronization: previous value kept, or Voluntary if new Links When an Orphan Segment or Orphan Coupon is re-associated to a Coupon or Segment, respectively, the Reason for De-synchronization is reset to Voluntary if the new links have a status Established, otherwise the original value is kept.

With respect to the processing of above-listed monitored PNR activities, non-limiting examples of several will now be provided as a general background to the operation of the ETIC (as the resulting Link values are examined and processed in an accordance with the operation of the PNR Monitoring System 100).

Name Element Add (NM ADD)

For Group PNRs, the addition of new passengers can be done at any time. This use case is handled by this callback. In the following processing, new segments added in the same PNR envelope are excluded, as they can be handled via the Itinerary Add callback processing.

For each monitored segment (excluding new segments added in the same PNR envelop), a new ETIC Cell 1100 is created with the following features (see FIG. 12A):

Origin: Temporary Coupon
Target: NM with identification of the passenger added
IT with identifier of the segment
Name Element Cancel (NM XCL)

Any ETIC Cell 1100 having a NM target with the identifier of the cancelled pax is cancelled, whatever the origin type and target products (IT or MC). As an ETIC Cell has a defined NM target, when the corresponding pax is cancelled the ETIC Cell is also cancelled (deleted). Reference in this regard can be made to FIG. 12B. Note that if the origin type is a Coupon, the corresponding ETIC Coupon is also cancelled.

Itinerary Add (IT ADD)

For each active passenger in the PNR, a new ETIC Cell 1100 is created with the following features (see FIG. 12C):

Origin: Temporary Coupon
Target: NM with identifier of the passenger
IT with identifier of the added segment If the segment has been added by a Re-accommodation, the Reason for De-synchronization field is set to Involuntary in the ETIC Links created for this segment.

Figure 12C:
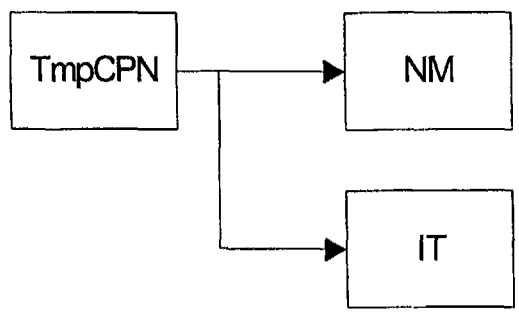
Figure 12D:
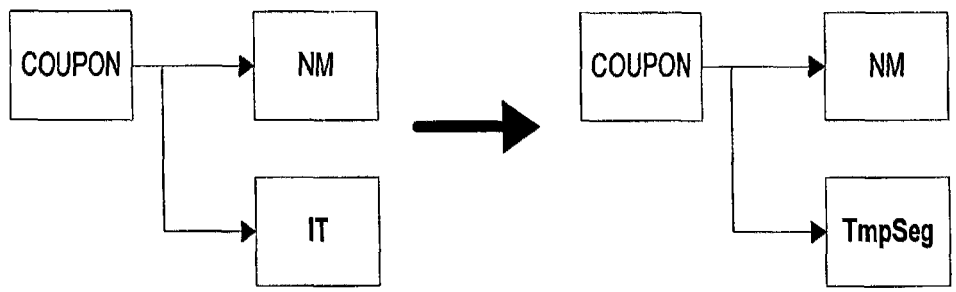

The more complex case of the Itinerary Cancel (IT XCL) will now be described in reference to FIGS. 12D, 12E and 12F.

A first step is ETIC Coupon handling, where a search is performed on all the existing ETIC Cells 1100 with the following features: Origin: Coupon and Target: IT with the identifier of the cancelled segment. For each located ETIC Cell 1100, if the ETIC Coupon has an Electronic type, as Orphan Electronic Coupons are monitored, the IT Target is replaced by a Temporary Segment (TmpSeg) (FIG. 12D). It can be noted that if the callback has been called by an Itinerary Change callback, and if the segment has been cancelled by a Re-accommodation, the field Reason for De-synchronization is set to Involuntary on the modified ETIC Links.

Figure 12E:
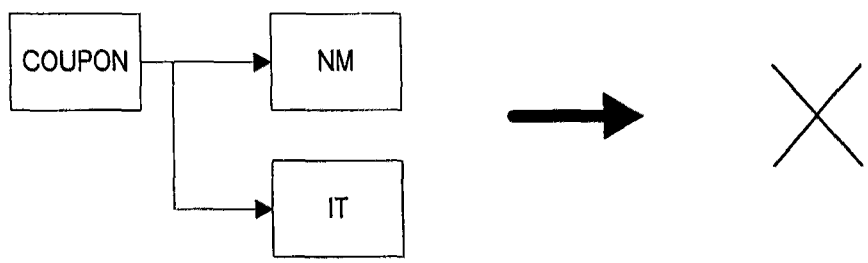

If the ETIC Coupon has a Paper type, and since Orphan Paper Coupons are not monitored, the ETIC Cell 1100 and corresponding ETIC Coupon are cancelled (FIG. 12E).

Figure 12F:
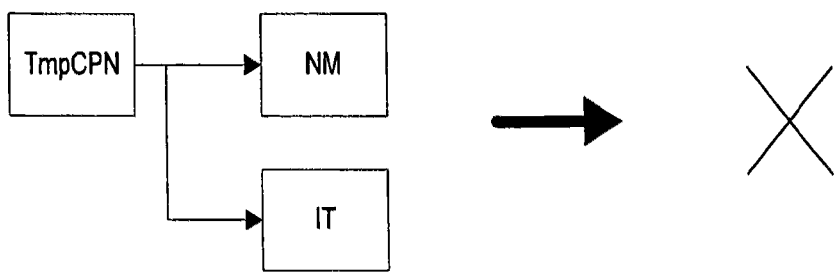

A second step of this process is Orphan ETIC Cell Cancellation (FIG. 12F). In this second step all existing ETIC Cells 1100 with the following features are cancelled:
  Origin: Temporary Coupon,
  Target: IT with the identifier of the cancelled segment.

Note that the processing for the Itinerary Delete (IT DEL) can be the same than as for the Itinerary Cancel. In this case the callback Itinerary Cancel is directly called to perform the updates.

The even more complex case of the Fare Element Add (FA ADD) will now be described in reference to FIGS. 12G through 12L.

This case begins with a preprocessing step where the following information is obtained for the Fare Add:
  Airline Number
  Prime Ticket number
  Coupon Type
  Doc Type
  Status Code
  List of association sequence number—segment identifier
  Pax identifier that is associated (the Infant (INF) identifier is obtained if the FA or MCO of the FA is INF)

If the Coupon Type is T, the FA has been created from a TST (Itinerary), the remainder of the process is described below in the section Handling of ETIC Links Update directly linked to FA Add.

If the Coupon Type is M, the FA has been created from a TSM (MCO), the remainder of the process is described in the section Handling of ETIC Links Update directly linked to FA Add, with some particularities described below
  Handling of ETIC Links Update directly linked to FA Add
  For each association (coupon number, segment or MCO) of the FA, the process checks if an ETIC Coupon already exists with same:
    Airline Number
    Prime Ticket Number
    Coupon Type (T or M)
    Sequence Number
    Associated to the involved pax.

In the remainder of the callback process this will be referred to as an "Existing ETIC Coupon".

Note in this regard that in the case of a Paper FA without coupon association, a pseudo coupon number '0' is associated with each segment linked to the FA. Also, in the case of a FA created from a TSM (MCO), the Coupon association is never set in the FA. However, as in this case the FA is a subtype from the MCO, it can be associated to this MCO only. A pseudo coupon number '1' is then associated to the unique MCO identifier.

Figure 12G:
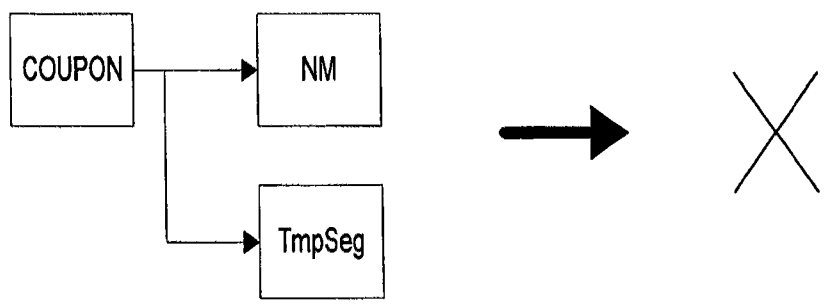

If the FA is voided (Status Code V) or refunded (Status Code R) this implies that the FA coupons are in a final status and thus are no longer monitored. In this case, and as is shown in FIG. 12G, if the ETIC Coupon exists, it is cancelled with the corresponding ETIC Cell having as an origin the ETIC Coupon identifier.

If the FA is not voided nor refunded, the process searches for the ETIC Cell 1100 with the following targets, and get its origin type and identifier:
  NM with identifier of the passenger or infant associated with the FA,
  IT/MC with the current Segment/MCO identifier.

In the remainder of the callback process this will be referred to as a "Previous ETIC Reference".

Figure 12H:
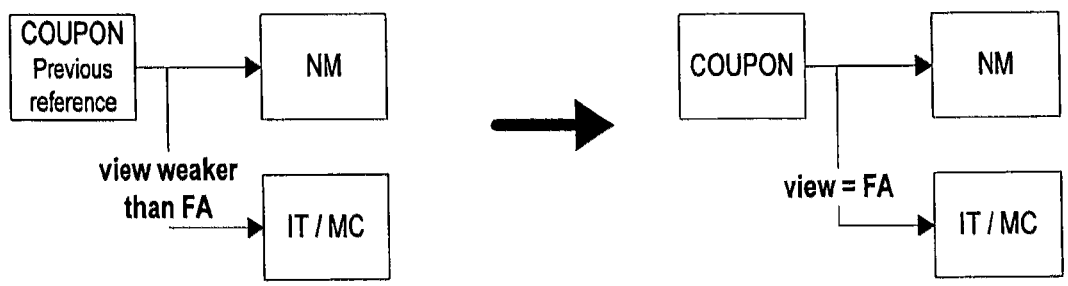

In a case where the ETIC Coupon did exist, if its origin identifier is the same as one of the Previous ETIC Reference, then it is indicated that an ETIC Coupon with same air prefix, ticket number and sequence number are already linked to the couple (Pax, Seg or MC), but with a link weaker than FA (such as Enhanced FHE, SSR TKNx). In this situation, and as is shown in FIG. 12H, the process updates the existing ETIC Cell 1100 with an Established link having FA as the view type. However, if the origin identifier is different than the one found in the Previous ETIC Reference, this reference is simply cancelled.

Figure 12I:
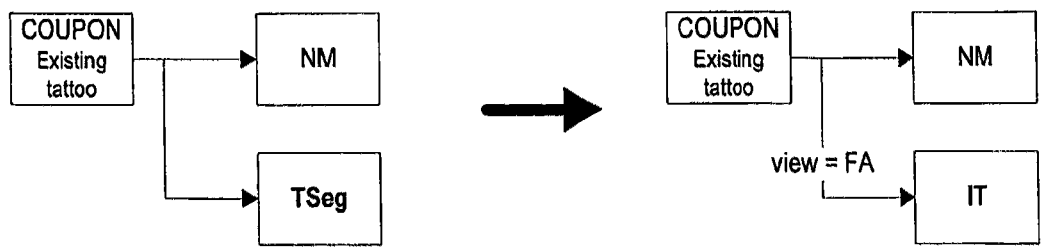

Referring to FIG. 12I, if the ETIC Cell 1100 of the Existing ETIC Coupon was pointing to a Temporary Segment, it is updated to point to the current segment identifier (tattoo) and passenger with Established links having FA as view type.

Figure 12J:
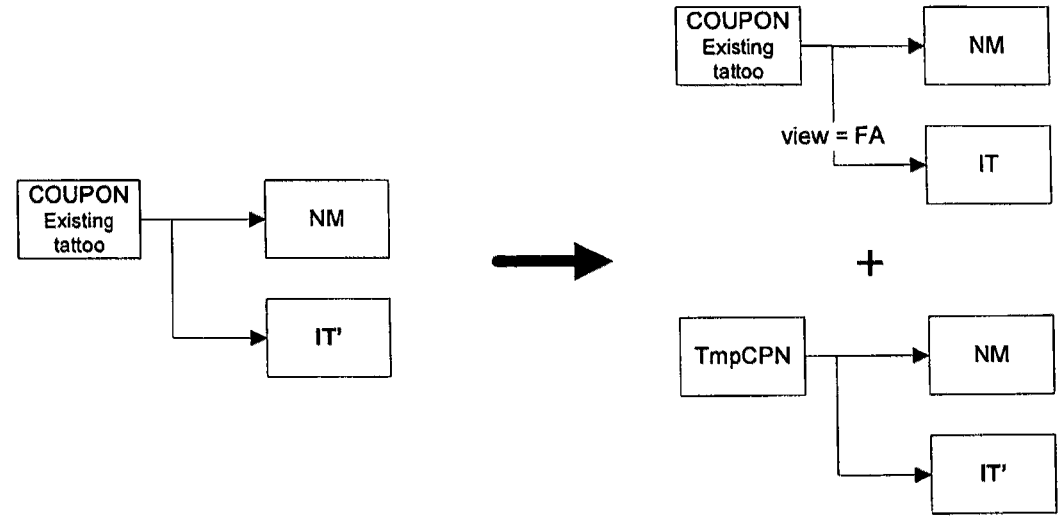

Referring to FIG. 12J, if the ETIC Cell 1100 of the Existing ETIC Coupon was pointing to a different segment IT', it is updated to point to the current segment identifier and passenger with Established links having FA as the view type, and a new ETIC Cell 1100 is created to reference the Orphan Segment IT'.

Referring to FIG. 12K, if the ETIC Coupon was found not to exist during the preliminary search it is created along with a new ETIC Cell 1100 to point to the current segment identifier and passenger with Established links having FA as the view type.

Finally, and referring to FIG. 12L, the process can cancel any previous reference (as defined above) and corresponding ETIC Coupon, if any.

In a case where the FA has a coupon type T (FA created from a TST), after the process is applied for all associated coupon-segments of the FA further operations (post processing) are employed to handle different use cases. This post processing can be referred to as post processing after update based on a FA created from a TST (Itinerary). This post processing checks to determine if there are active FO elements in the PNR for the passenger associated with the FA. If any are found this indicates there has been a reissue from the tickets referenced in the FO elements. Thus, the process cancels all of the Orphan ETIC Coupons Elements and Cells linked to the pax and having their air prefix and ticket number referenced in the FO elements found for this same pax.

FHE are fare elements used to manually add a reference to an electronic ticket in a PNR. Unlike FA elements, FHE ticket references are not trusted since they are manually provided by agents. In the scope of the PNR monitoring system, it is preferred to always consider FHE coupons as an orphan cell.

In order not to retain Orphan references on FHE with the same ticket and pax after the FA addition, the process searches and deletes (cancels) all manual references, i.e., all active Orphan ETIC Coupons and Cells associated with the involved pax with the same air prefix and ticket number as those associated with the FA, and that were created by an element without coupon association.

The foregoing several ETIC Cell-related procedures are provided as non-limiting examples of the processing that can be performed by the ETIC in association with the operation of the PNR Monitoring System 10. A feature of the PNR Monitoring System 100 is that it can re-use at least part of the ETIC data structure (e.g., the product and document links of the ETIC Cells 100) in order to provide enhanced information regarding the occurrence of a de-synchronization event, as well as a reason or reasons for the cause of the de-synchronization event.

Figure 13:
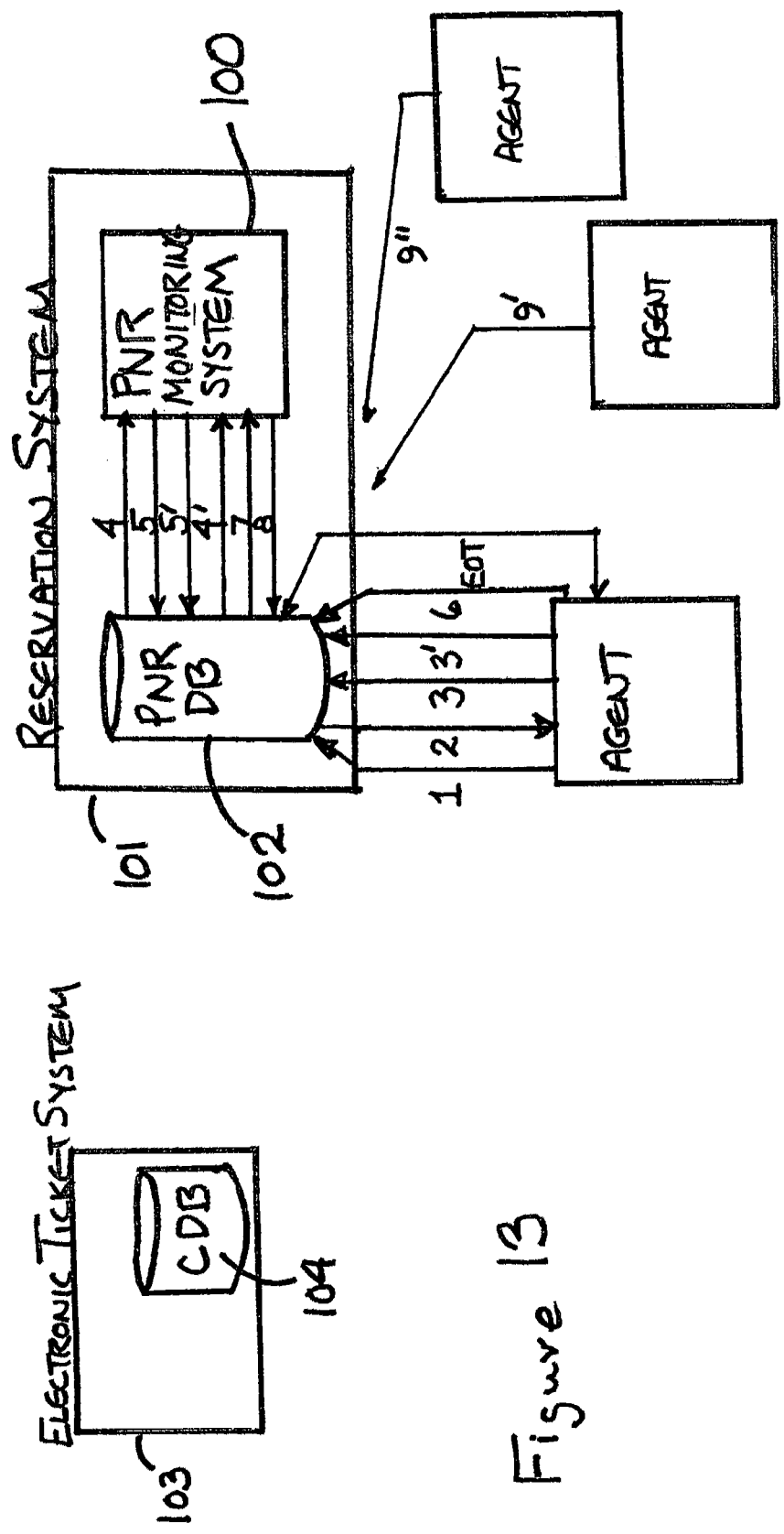
FIG. 13 is a high level block diagram of the operation of the PNR Monitoring System in accordance with the embodiments of this invention.

FIG. 13 is a high level block diagram of the operation of the PNR Monitoring System 100 in accordance with the embodiments of this invention. As was described above, the PNR Monitoring System 100 enables the agent to have knowledge of de-synchronized PNRs, as well as to have knowledge of what actions led to a de-synchronization for a given PNR. This differs from the goal of the ETIC which is primarily to reconcile a PNR and its image, but not to provide specific data (formatted and presented for review by an agent) regarding why there has been a de-synchronization.

The PNR Monitoring System 100 can be considered to be a part of, or at least interfaced with, the Reservation System (RES) 101. The RES 101 includes the PNR DB 102. Also shown in FIG. 13 is the E-Ticket System 103 having the coupon DB 104. The PNR Monitoring System 100 checks and analyses automatically each action performed on PNRs stored in the PNR DB 102. When an action leads to an occurrence of a de-synchronization event the PNR Monitoring System 100 changes the status of the PNR from Established to Orphan.

The PNR matrix comprises cells (ETIC Cells 1100) composed of three elements: Coupon+Product or Segment+Passenger information (pax target). When there is no data for one of these elements then its value is set to Temporary, as was described above with respect to building the ETIC Link Matrix.

At an end of transaction (EOT) the PNR Monitoring System 100 makes an analysis as to whether the final status should be changed to Established. This may be the case where a combination of actions made by the agent led to no de-synchronization occurring. For example, the agent may have added a new segment/service and then removed the added segment/service. However, the final status may instead be to indicate that a de-synchronization event has occurred. In either case the final status is saved in the PNR Matrix of the PNR DB 102.

As such, it can be appreciated that there exists real time information as to the status of the PNR. Based on this real time information embedded in the PNR Matrix the PNR Monitoring System 100 can provide information to the various modules discussed above, i.e., the Divergence Banner 614, Ticketing Diagnostic Display 616, Unmatched List 618 and the Check-In Flag 620.

The following numbered steps reflect the various arrows shown in FIG. 13. FIG. 13 can be contrasted with the interactions shown in the conventional operation depicted in FIG. 1C.

First the PNR is linked to the PNR DB 102 of the RES 101.

1. The agent requests a particular PNR.
2. The requested PNR is retrieved from the PNR DB 102.
3. The agent performs some action on the retrieved PNR.
4. The PNR Monitoring System 100 monitors each action performed by the agent to the PNR and analyses whether the action has led to a de-synchronization. In case the action has resulted in the occurrence of a de-synchronization event the status of the PNR is set to Orphan.
5. The PNR Monitoring System 100 saves in the PNR Matrix the action that was performed. The PNR Monitoring System 100 then sends the status to the PNR Matrix and updates the PNR Matrix. At this stage the status of the PNR is not saved. In a case where the action of the agent has not resulted in a de-synchronization, PNR Monitoring System 100 does not change the status in the PNR Matrix, and the status of the PNR would thus remain Established.

According to the preferred embodiments, and so as long as there is no de-synchronization, steps 3, 4, 5 are reiterated for each new action (see steps 3', 4', 5') on that PNR until the status is set to Orphan (if it is). When the status is set to Orphan the steps 3, 4, 5 are not reiterated and the PNR Monitoring System 100 waits for step 6. This embodiment thus allows reducing significantly the number of analyses that are performed.

6. The Reservation System 101 receives an end of transaction message EOT from the agent, meaning that the operation(s) on this PNR are completed.
7. At the receipt of the EOT the PNR Monitoring System 100 determines the final status of the PNR, which may be different from Orphan in a case where the various actions that the agent performed after the status was set to Orphan actually resulted in a re-synchronization of the PNR.
8. The PNR Monitoring System 100 saves in the PNR Matrix of the PNR DB 102 the final transaction status. In a case where no EOT is received it is implied that the agent did not save any changes made to the PNR and the end of transaction status is not saved in the PNR DB 102.
9, 9', 9". The PNR Matrix sends the saved status of the PNR either automatically or upon reception of queries from various actors (agents) enabling the various Divergence Banner 614, Ticketing Diagnostic Display 616, Unmatched List 618 and the Check-In Flag 620 modules to function as described above.

As can be appreciated, one non-limiting advantage gained from the use of the PNR Monitoring System 100 is an ability to perform real-time monitoring and analysis of the actions performed on each PNR.

A further example of an advantage gained from the use of the exemplary embodiments is that as all actions that are performed are saved in the PNR Matrix, it is possible for an agent to understand how a particular PNR came to have an Orphan status. Any necessary modifications to re-synchronize the PNR are thus much easier to accomplish.

Further, the steps 4 and 5 are not time consuming or CPU intensive, and can be performed without a need for any additional information that must be retrieved from outside the Reservation system 101 (e.g., no data is needed from the E-Ticket System 103). This is beneficial since in many deployments the Reservation System 101 and the E-Ticket System 103 are operated by distinct entities, such as by the GDS and an airline, respectively. As a result the status of the PNR is known in real-time (PNRs are not processed in a non-real time batch mode as may be the case for ETIC).

In general, the ETIC Monitoring Service 600 and the PNR Monitoring System 100 may be viewed as being complimentary. The main distinctions between them can be summarized as follows.

(A) The ETIC reconciliation process is an external process using the public interfaces of the Reservation and E-ticketing Systems 101 and 103, while the PNR Monitoring System 100 is implemented within the Reservation System 101.

(B) An objective of ETIC is to reconcile the PNR and Ticket databases 102 and 104, while an objective of the PNR Monitoring System 100 is to provide diagnostic information to the agent.

(C) The ETIC reconciles databases in the "back office", while the PNR Monitoring System 100 is an interactive system for "front office" use.

(D) The PNR Monitoring System 100 re-uses part of the ETIC data structure (the product_x_document links of the ETIC Cell 1100) but in a different way. The PNR Monitoring System 100 does not attempt to rebuild matches between Orphan coupons and Orphan segments.

Unlike ETIC, which is an external system and needs to rebuild links in memory after each PNR storage, the PNR Monitoring System 100 benefits from its position within the Reservation System 101. This is due at least to the fact that the PNR Monitoring System 100 saves links status within the PNR and updates the link status during PNR storage into the PNR DB 102.

Referring again to FIG. 9D it can be seen how the PNR Monitoring System 100 maintains the state of the product_x_document links. Each time a PNR is saved in the Reservation System 101 the Monitoring Spy (ETIC Spy 700 shown in FIG. 7) is called and checks for all modified elements in the PNR since the last change. The states of related links are modified accordingly.

For example, if a new ticket reference (FA) is found in the PNR, then the PNR Monitoring System 100 retrieves its links with AIR segments and updates their status from Orphan to Established. Once the links are stored and updated within the PNR DB 102 the Banner Raising 614 and TDD 616 features can be invoked.

As an example of typical queries performed to the PNR Link Matrix, assume that once the Link Matrix has been updated at the EOT a check is made to determine if the Monitoring Banner 614 should be raised on the next display of the PNR. To accomplish this two indicators can be updated in the PNR: airDivergence and tsmDivergence. If either of these indicators is set to true then the Banner 614 is raised on the next PNR display. The airDivergence computation is used as an example, however the algorithm is similar for tsmDivergence.

By the use of the ETIC links, the functional requirements of the algorithm may be expressed as follows: the airDivergence indicator is set to true if any ETIC link with an AIR segment as a targeted product is found in the PNR with a status of Orphan or Manually Established (this latter status shows that an agent has manually associated the segment with a manual ticket reference entry (FHE or SSR TKT)). This logic translates into the following exemplary pseudo code, where the function is stored in the airDivergence indicator:

```
function computeAirDivergence( )
{
    list<links> listLinks = matrix.retrieveLinks(originType in [TMP_CPN, CPN], targetType in [TMP_SEG, SEG])
    for each link in listLinkks
    (
        if link.status is in [ORPHAN, MANUALLY_ESTABLISHED]
            return True
    }
    return False;
}
```

Figure 14:
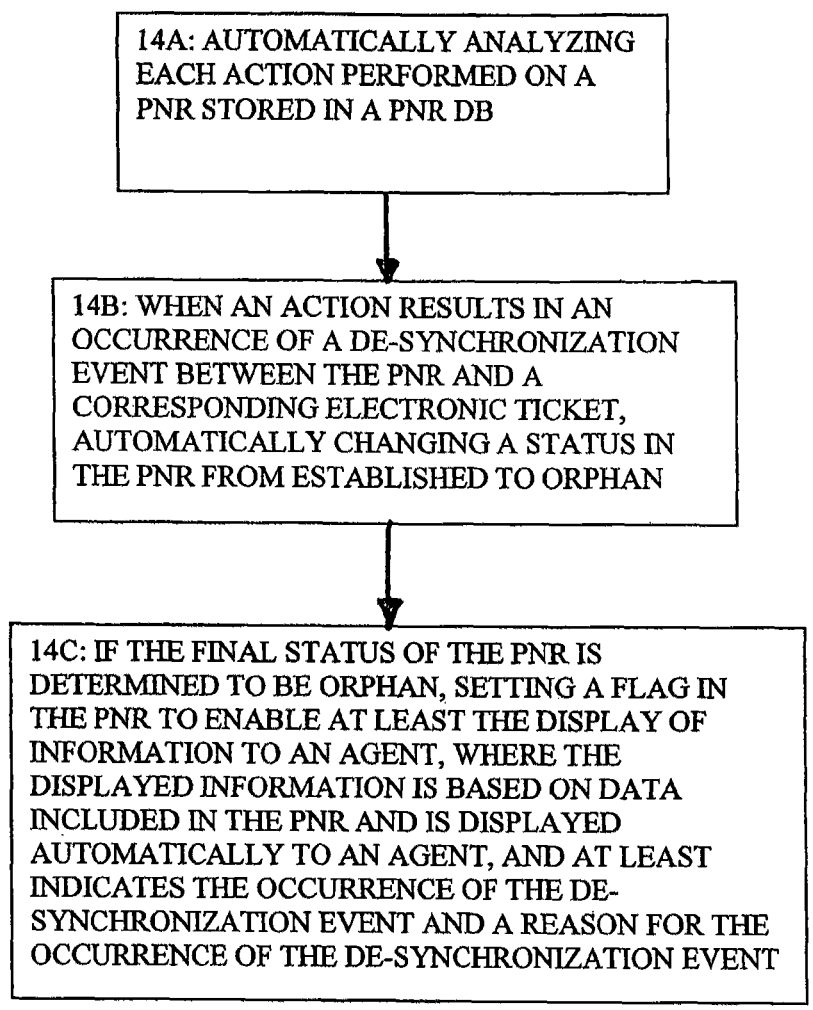
FIG. 14 is a logic flow diagram that is descriptive of a method and the execution of computer program code in accordance with the invention.

FIG. 14 is a logic flow diagram that is descriptive of a method and the execution of computer program code in accordance with the invention. Depicted is a method to analyze passenger name records (PNRs) stored in a PNR database (DB), comprising steps of: (Block 14A) automatically analyzing each action performed on a PNR stored in the PNR DB; (Block 14B) when an action results in an occurrence of a de-synchronization event between the PNR and a corresponding electronic ticket, automatically changing a status in the PNR from Established to Orphan; and (Block 14C) if the final status of the PNR is determined to be Orphan, setting a flag in the PNR to enable at least the display of information to an agent, where the displayed information is based on data included in the PNR and is displayed automatically to an agent, and at least indicates the occurrence of the de-synchronization event and a reason for the occurrence of the de-synchronization event.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent algorithms and data representations may be attempted by those skilled in the art. Further, the various names used for the different elements and functions (e.g., PNR Monitoring System, Divergence Banner, etc.) are merely descriptive and are not intended to be read in a limiting sense, as these various elements and functions can be referred to by any suitable names. All such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

The invention claimed is:

1. A method to analyze passenger name records (PNRs) stored in a PNR database (DB), comprising steps of:

using at least one data processor, and without accessing an electronic ticket system, automatically analyzing each action performed on a PNR stored in the PNR DB to determine when an action results in an occurrence of a de-synchronization event between the PNR and a corresponding electronic ticket;

in response to determining that an action results in an occurrence of a de-synchronization event between the PNR and the corresponding electronic ticket, automatically changing a status in the PNR from Established to Orphan using the at least one data processor; and using the at least one data processor, determining if a final status of the PNR is Orphan, and in response thereto setting a flag in the PNR to enable at least the display of information to an agent, where the displayed information is based on data included in the PNR and is displayed automatically to an agent, and where the displayed information at least indicates the occurrence of the de-synchronization event and all actions performed on the PNR.

2. The method of claim 1, where analyzing comprises considering PNR cells each having as elements an origin linked to a passenger target and to a product target, determining if there is no data for one of these elements and setting its value to temporary in response thereto.

3. The method of claim 2, where the information is used to provide to the agent upon request a ticketing diagnostic that indicates, for a particular passenger, any documents and products that are Orphan.

4. The method of claim 3, where the information is used to provide to the agent, when a particular flight is entering a departure control system (DCS) window, a passenger name list (PNL) by automatically triggering the ticketing diagnostic to provide the agent with a list of those PNRs having either a de-synchronization event indicated with an electronic ticket or an unpaid service indicated.

5. The method of claim 2, where the origin is one of a temporary coupon or a coupon.

6. The method as in claim 1, further comprising storing the PNR in the PNR DB, where the flag is set in the PNR prior to storage of the PNR in the PNR DB.

7. The method of claim 6, where the information is displayed automatically to the agent in response to the flag being set a next time that the PNR is accessed from the PNR DB.

8. The method as in claim 1, where the final status is determined in response to an agent entering an end of transaction to indicate that the agent has completed performing actions on the PNR.

9. The method of claim 1, where the information indicates at least a reason for the occurrence of the de-synchronization event.

10. The method of claim 1, where the information indicates at least a reason for the occurrence of the de-synchronization event and is sufficient to permit the agent to perform a manual reconciliation of the de-synchronization event.

11. The method of claim 1, where when an action has resulted in an occurrence of a de-synchronization event between the PNR and a corresponding electronic ticket, and once the status in the PNR has been changed from Established to Orphan;
then, whatever are the actions subsequent to the action resulting in changing the status in the PNR from Established to Orphan, maintaining the status Orphan until receiving from the agent an end of transaction to indicate that the agent has completed performing actions on the PNR;
then determining if there is still a de-synchronization event between the PNR and the corresponding electronic ticket;
if it is determined that there is still a de-synchronization event between the PNR and the corresponding electronic ticket, then maintaining the status Orphan otherwise setting the status to Established.

12. The method of claim 1, where the information is used to provide to the agent upon request a list of all PNRs in the PNR DB that are associated with a particular flight and that require manual resolution of de-synchronization events.

13. The method of claim 1, wherein analyzing each action is performed internally in a reservation system.

14. The method of claim 1, further comprising reconciling the PNR DB with a ticket DB using a synchronization system, wherein analyzing each action is performed externally from the synchronization system.

15. The method of claim 1, wherein automatically analyzing each action determines when an action results in an occurrence of a de-synchronization event in real time.

16. A non-transitory computer-readable medium that contains software program instructions, where execution of the software program instructions by at least one data processor results in performance of operations that comprise execution of the method as in claim 1.

17. A computer-implemented travel reservation system comprising at least one data processor and a passenger name record (PNR) database (DB), and further comprising an analyzer configured to upon execution by the at least one data processor, and without accessing an electronic ticket system, automatically analyze each action performed on a PNR stored in the PNR DB to determine when an action results in an occurrence of a de-synchronization event between the PNR and a corresponding electronic ticket and to, in response to determining that an action results in an occurrence of a de-synchronization event between the PNR and the corresponding electronic ticket, automatically change a status in the PNR from Established to Orphan, said analyzer being further configured to determine if a final status of the PNR is Orphan and in response thereto to set a flag in the PNR to enable at least the display of information to an agent, where the displayed information is based on data included in the PNR and is displayed automatically to an agent, and at least indicates the occurrence of the de-synchronization event and a reason for the occurrence of the de-synchronization event.

18. The system of claim 17, where said analyzer is configured to analyze PNR cells each having as elements an origin linked to a passenger target and to a product target, and if there is no data for one of these elements said analyzer sets its value to temporary.

19. The system of claim 18, where the origin is one of a temporary coupon or a coupon.

20. The system as in claim 17, where the final status is determined in response to an agent entering an end of transaction to indicate that the agent has completed performing actions on the PNR, and where the flag is set in the PNR prior to storage of the PNR in the PNR DB.

21. The system of claim 17, where the information is used to create a display for indicating for one or more of a specific passenger or a specific flight a list of all associated de-synchronization events, and is structured to contain sufficient information to enable an agent to perform a manual reconciliation of any de-synchronization events.

22. The system of claim 17, where the flag is set in the PNR prior to storage of the PNR in the PNR DB, and where the information is displayed automatically to the agent in response to the flag being set a next time that the PNR is accessed from the PNR DB, and where the information indicates at least a reason for the occurrence of the de-synchronization event and is sufficient to permit the agent to perform a manual reconciliation of the de-synchronization event.

23. The system of claim 17, where when an action has resulted in an occurrence of a de-synchronization event between the PNR and a corresponding electronic ticket, and once the status in the PNR has been changed from Established to Orphan, said analyzer is configured to;
whatever are the actions subsequent to the action resulting in changing the status in the PNR from Established to Orphan, to maintain the status Orphan until receiving from the agent an end of transaction to indicate that the agent has completed performing actions on the PNR;
to then determine if there is still a de-synchronization event between the PNR and the corresponding electronic ticket; and
if it is determined that there is still a de-synchronization event between the PNR and the corresponding electronic ticket, to maintain the status Orphan or otherwise to set the status to Established.

24. A method to analyze passenger name records (PNRs) stored in a PNR database (DB) of a reservation system, comprising:
using at least one data processor, initiating a transaction with a PNR from the PNR DB of the reservation system in response to an agent request by retrieving a PNR;
using the at least one data processor, monitoring in real time each action performed by the agent on the retrieved PNR during the transaction to identify a first action that results in an occurrence of a de-synchronization event between the PNR and a corresponding electronic ticket, wherein identifying the first action is performed without accessing an electronic ticket system;
after identifying the first action, logging the first action using the at least one data processor;

after a completion of the transaction, setting a status for the PNR that indicates that an action has been performed that results in an occurrence of a de-synchronization event between the PNR and the corresponding electronic ticket using the at least one data processor; and after setting the status, sending information to at least one agent using the at least one data processor, wherein the information at least indicates the occurrence of the de-synchronization event and the logged first action.

* * * * *